United States Patent
Taylor et al.

(10) Patent No.: US 10,458,099 B2
(45) Date of Patent: Oct. 29, 2019

(54) AUTO RECOGNITION OF AT LEAST ONE STANDOFF TARGET TO DETERMINE POSITION INFORMATION FOR A MOBILE MACHINE

(71) Applicant: Caterpillar Trimble Control Technologies LLC, Dayton, OH (US)

(72) Inventors: Arthur James Taylor, Boulder, CO (US); Mark Nichols, Christchurch (NZ); Philip Jackson, Governors Bay (NZ)

(73) Assignee: Caterpillar Trimble Control Technologies LLC, Dayton, OH (US)

(*) Notice: Subject to any disclaimer, the term of this patent is extended or adjusted under 35 U.S.C. 154(b) by 181 days.

(21) Appl. No.: 14/572,526

(22) Filed: Dec. 16, 2014

(65) Prior Publication Data
US 2015/0106004 A1 Apr. 16, 2015

Related U.S. Application Data

(63) Continuation-in-part of application No. 13/911,922, filed on Jun. 6, 2013, now Pat. No. 9,481,983, which
(Continued)

(51) Int. Cl.
*E02F 9/26* (2006.01)
*E02F 3/84* (2006.01)
(Continued)

(52) U.S. Cl.
CPC .............. *E02F 9/264* (2013.01); *E02F 3/842* (2013.01); *E02F 3/847* (2013.01); *G01S 15/46* (2013.01); *G01S 17/46* (2013.01); *G01S 19/03* (2013.01)

(58) Field of Classification Search
CPC .......... E02F 3/841; E02F 3/842; G01S 17/46; G05D 1/0234
(Continued)

(56) References Cited

U.S. PATENT DOCUMENTS 3,604,512 A 9/1971 Carter et al.
3,901,597 A 8/1975 White
(Continued)

FOREIGN PATENT DOCUMENTS

DE 10333012 A1 10/2004
JP 07-150597 6/1995
(Continued)

OTHER PUBLICATIONS

Enge, et al., "Combining pseudoranges from GPS and Loran-C for air navigation", Position Location and Navigation Symposium, 1990. Record 'The 1990's—A Decade of Excellence in the Navigation Sciences'. IEEE PLANS '90., IEEE, Mar. 20-23, 1990, 36-43.
(Continued)

*Primary Examiner* — Abby Y Lin
*Assistant Examiner* — Kelly D Williams
(74) *Attorney, Agent, or Firm* — Kilpatrick Townsend & Stockton

(57) ABSTRACT

A method and system for auto recognition of at least one standoff target to determine position information for a mobile machine. One example automatically scans for at least one standoff target. A location for the at least one standoff target is determined. In addition, a distance and direction between the mobile machine and the at least one standoff target is generated. The location information for the at least one standoff target and the distance and direction
(Continued)

between the mobile machine and the at least one standoff target is utilized to provide a position for the mobile machine.

18 Claims, 13 Drawing Sheets

Related U.S. Application Data is a continuation of application No. 10/928,070, filed on Aug. 26, 2004, now Pat. No. 8,478,492.

(51) Int. Cl.
  *G01S 17/46* (2006.01)
  *G01S 19/03* (2010.01)
  *G01S 15/46* (2006.01)

(58) Field of Classification Search
  USPC ................................ 701/32.3, 445, 448, 501
  See application file for complete search history.

(56) References Cited

U.S. PATENT DOCUMENTS

| | | | |
|---|---|---|---|
| 4,733,609 A | | 3/1988 | Goodwin et al. |
| 4,807,131 A | | 2/1989 | Clegg |
| 5,165,064 A | * | 11/1992 | Mattaboni ............ G05D 1/0234 356/141.2 |
| 5,258,961 A | | 11/1993 | Sehr et al. |
| 5,404,661 A | | 4/1995 | Sahm et al. |
| 5,438,771 A | | 8/1995 | Sahm et al. |
| 5,477,459 A | | 12/1995 | Clegg et al. |
| 5,493,494 A | | 2/1996 | Henderson |
| 5,551,518 A | | 9/1996 | Stratton |
| 5,559,725 A | | 9/1996 | Nielson et al. |
| 5,602,741 A | | 2/1997 | Talbot et al. |
| 5,612,864 A | | 3/1997 | Henderson |
| 5,666,792 A | | 9/1997 | Mullins |
| 5,848,485 A | | 12/1998 | Anderson et al. |
| 5,880,681 A | | 3/1999 | Codina et al. |
| 5,935,183 A | | 8/1999 | Sahm et al. |
| 5,974,348 A | * | 10/1999 | Rocks ....................... G01S 1/70 348/120 |
| 5,987,371 A | | 11/1999 | Bailey et al. |
| 6,028,524 A | | 2/2000 | Hartman et al. |
| 6,064,940 A | * | 5/2000 | Rodgers ................. G01C 15/02 342/450 |
| 6,141,612 A | | 10/2000 | Flamme et al. |
| 6,199,000 B1 | | 3/2001 | Keller et al. |
| 6,324,455 B1 | | 11/2001 | Jackson |
| 6,405,132 B1 | * | 6/2002 | Breed .................... B60N 2/002 701/117 |
| 6,418,364 B1 | | 7/2002 | Kalafut et al. |
| 6,581,695 B2 | | 6/2003 | Bernhardt et al. |
| 7,081,606 B2 | | 7/2006 | Osaragi et al. |
| 7,139,662 B2 | | 11/2006 | Ericsson et al. |
| 7,605,692 B2 | | 10/2009 | Yamada et al. |
| 7,831,362 B2 | | 11/2010 | Ishibashi et al. |
| 7,856,727 B2 | | 12/2010 | Chiorean et al. |
| 7,890,235 B2 | | 2/2011 | Self et al. |
| 8,082,084 B2 | | 12/2011 | Nichols |
| 8,340,873 B2 | | 12/2012 | Finley et al. |
| 8,412,418 B2 | | 4/2013 | Kumagai et al. |
| 8,478,492 B2 | | 7/2013 | Taylor et al. |
| 2005/0187731 A1 | | 8/2005 | Ericsson et al. |
| 2005/0274879 A1 | | 12/2005 | Osaragi et al. |
| 2006/0012777 A1 | | 1/2006 | Talbot et al. |
| 2007/0052950 A1 | | 3/2007 | Taylor et al. |
| 2010/0121540 A1 | | 5/2010 | Kumagai et al. |
| 2011/0169949 A1 | | 7/2011 | McCain et al. |
| 2011/0178677 A1 | | 7/2011 | Finley et al. |
| 2011/0256800 A1 | * | 10/2011 | Jennings ................... G01S 1/70 446/456 |
| 2011/0311342 A1 | | 12/2011 | Montgomery |
| 2012/0236142 A1 | | 9/2012 | Enix |
| 2013/0103271 A1 | * | 4/2013 | Best ........................ G06F 19/00 701/50 |
| 2013/0275035 A1 | | 10/2013 | Taylor et al. |
| 2013/0282266 A1 | | 10/2013 | Taylor et al. |

FOREIGN PATENT DOCUMENTS

| | | |
|---|---|---|
| JP | 2002-070082 | 3/2002 |
| WO | 9904106 A1 | 1/1999 |
| WO | 99/28565 | 6/1999 |

OTHER PUBLICATIONS

Kugler, et al., "Combined use of GPS and LORAN-C in integrated navigation systems", Fifth International Conference on Satellite Systems for Mobile Communications and Navigation, 1996, May 13-15, 1996, 7-11.

* cited by examiner

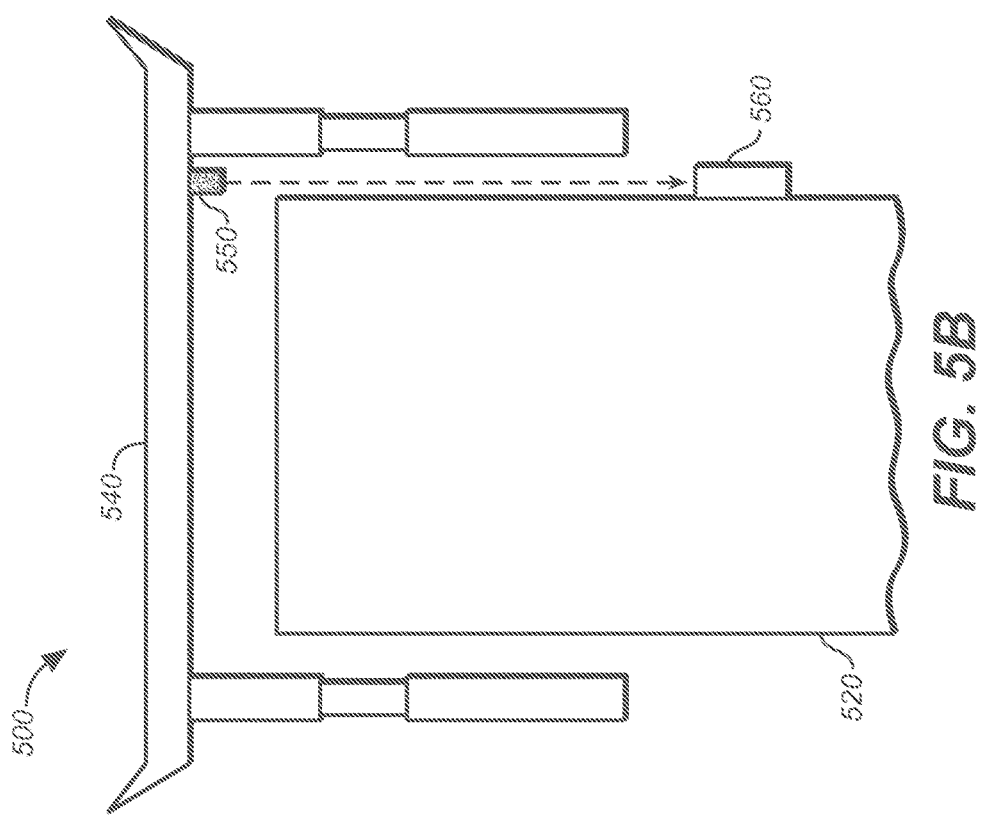
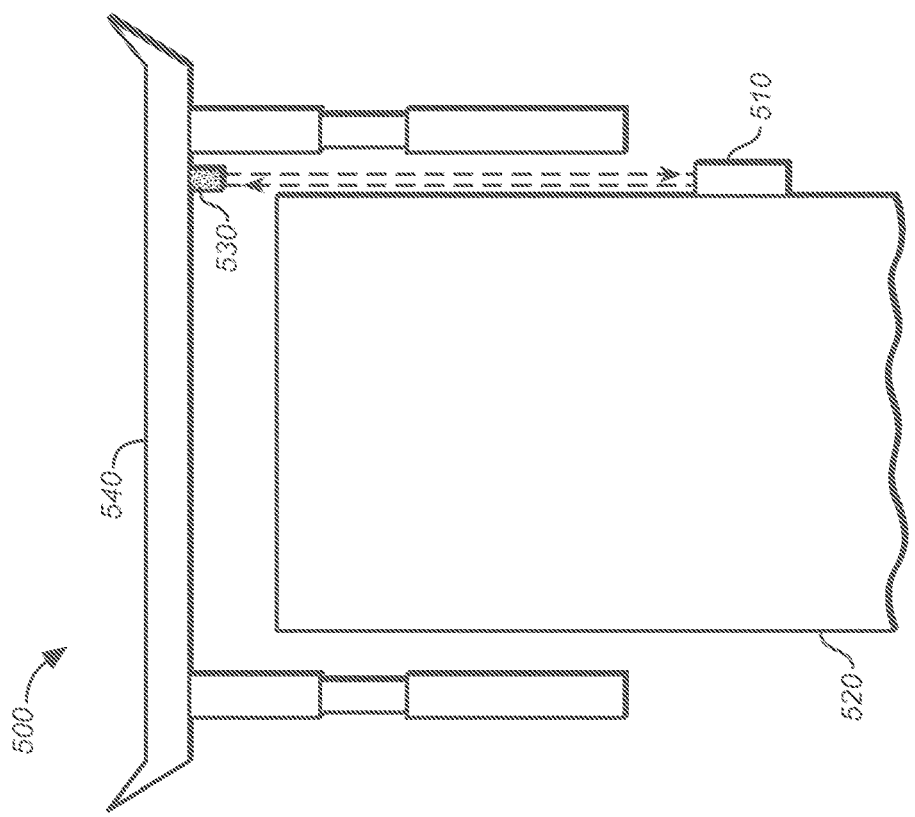

US 10,458,099 B2

AUTO RECOGNITION OF AT LEAST ONE STANDOFF TARGET TO DETERMINE POSITION INFORMATION FOR A MOBILE MACHINE

CROSS-REFERENCE TO RELATED APPLICATIONS—CONTINUATION-IN-PART

This application is a Continuation-in-Part application of and claims the benefit of U.S. patent application Ser. No. 13/911,922 filed on Jun. 6, 2013 entitled "PERFORMING NON-CONTACT BASED DETERMINATION OF THE POSITION OF AN IMPLEMENT" by ARTHUR TAYLOR et al., and assigned to the assignee of the present application; the disclosure of U.S. patent application Ser. No. 13/911,922 is hereby incorporated herein by reference in its entirety.

U.S. patent application Ser. No. 13/911,922 was a Continuation application of and claimed the benefit of then U.S. patent application Ser. No. 10/928,070 (now issued U.S. Pat. No. 8,478,492), filed on Aug. 26, 2004, entitled "A METHOD AND SYSTEM FOR PERFORMING NON-CONTACT BASED DETERMINATION OF THE POSITION OF AN IMPLEMENT," by Arthur Taylor et al., and assigned to the assignee of the present application; the disclosure of U.S. patent application Ser. No. 10/928,070 was incorporated by reference in its entirety into U.S. patent application Ser. No. 13/911,922.

U.S. patent application Ser. No. 10/928,070 claimed priority to International Patent Application Number PCT/SE98/02167 by Lars Ericsson, et al., filed on Nov. 27, 1998, entitled "Device and Method for Determining the Position of a Working Part" and assigned to the assignee of the present application.

The present application is also related to U.S. patent application Ser. No. 13/795,945 filed on Mar. 12, 2013 entitled "SYSTEMS FOR PERFORMING NON-CONTACT BASED DETERMINATION OF THE POSITION OF AN IMPLEMENT" by Arthur Taylor et al., which is a Divisional application of and claimed benefit of then U.S. patent application Ser. No. 10/928,070 filed on Aug. 26, 2004, entitled "A METHOD AND SYSTEM FOR PERFORMING NON-CONTACT BASED DETERMINATION OF THE POSITION OF AN IMPLEMENT," by Arthur Taylor et al.; U.S. patent application Ser. No. 13/795,945 and U.S. patent application Ser. No. 10/928,070 (now issued U.S. Pat. No. 8,478,492) are assigned to the assignee of the present application.

BACKGROUND

Earth moving machines such as bulldozers, motor graders, scrapers, excavators, etc., are used to contour the ground for a variety of projects such as construction (e.g., roads, buildings, parks, and the like), mining, and agriculture. In order to achieve a pre-determined topography, it is important that soil is accurately removed from or added to selected areas. Therefore it is important to accurately control the operation of the working implement of the earth moving machine performing the contouring. More specifically, it is important to know the geographic location of the working edge of the implement (e.g., the bottom edge of a bulldozer blade) in 3 dimensions (e.g., latitude, longitude, and elevation) to accurately contour the site.

FIG. 1 shows a bulldozer 100 which uses a prior art positioning system to determine the location of the working edge 111 of blade 110. In FIG. 1, bulldozer 100 utilizes two masts (e.g., masts 112a and 112b), each of which are coupled with blade 110 and support a positioning system antenna (e.g., antennas 113a and 113b). Antennas 113a and 113b are used to receive data signals from a positioning system (e.g., global positioning system (GPS), GLONASS, etc.) to determine the position of working edge 111. For example, antenna 113a receives a GPS signal which is typically used to determine the geographic position of antenna 113a in 3 dimensions. Similarly, antenna 113b receives a GPS signal which is used to determine its geographic position in 3 dimensions.

Because the vector from antenna 113a to corner 111a is known, the geographic position of corner 111a can be derived using the geographic position of antenna 113a. Similarly, the geographic position of corner 111b can be derived. Using this information, the geographic position of working edge 111 can be derived.

One disadvantage to the positioning system of FIG. 1 is the necessity of using masts 112a and 112b to support antennas 113a and 113b. Antennas 113a and 113b are not typically mounted directly on blade 110 because soil piling over the top of blade 110 will damage antennas 113a and 113b. Additionally, the masts elevate antennas 113a and 113b to improve reception of the positioning system signals. Therefore masts 112a and 112b are used to isolate antennas 113a and 113b from this type of damage. However, when working in areas with overhanging tree branches and/or heavy brush, antennas 112a and 112b are still exposed to physical damage from the branches.

Another disadvantage of the positioning system of FIG. 1 is that the wires 114a and 114b coupling antennas 113a and 113b with a control unit 115 are exposed and susceptible to damage (e.g., from overhanging branches and/or brush). Additionally, antennas 113a and 113b are exposed to a significant amount of vibration when blade 110 is being used, which can damage the antennas over time.

FIG. 2 shows an exemplary motor grader 200 using a prior art positioning system similar to the positioning system described above with reference to FIG. 1. In the embodiment of FIG. 2, masts 212a and 212b couple antennas 213a and 213b with blade 210. In addition to the disadvantages discussed above with reference to FIG. 1, when used with a motor grader, masts 212a and 212b significantly restrict the range of motion of blade 210. For example, blade 210 can be rotated in 3 dimensions with respect to motor grader 200 and can be offset from the center line axis of motor grader 200 such that it extends to one side or the other of motor grader 200. Thus, a motor grader without masts 212a and 212b can typically extend blade 210 to the left until the right side edge of blade 210 is to the left of the center axis of beam 220 of motor grader 200. However, this range of motion for blade 210 is prevented in the embodiment of FIG. 2 by masts 212a and 212b.

Using contact-based measurement systems to determine the position of the blade are disadvantageous in that they require some or all of: stepper motors, potentiometers, accelerometers, etc., to determine the position of the blade. These components can be incorporated into the machine when it is built, or an after-market kit can be installed upon the vehicle. However, incorporating these components into the machine when it is built can be too expensive for some users and the after-market kits are still subject to the damage as described above.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

FIGS. 5A and 5B show a non-contact based measurement system used in accordance with embodiments of the present invention.

DESCRIPTION OF EMBODIMENTS

Figure 1:
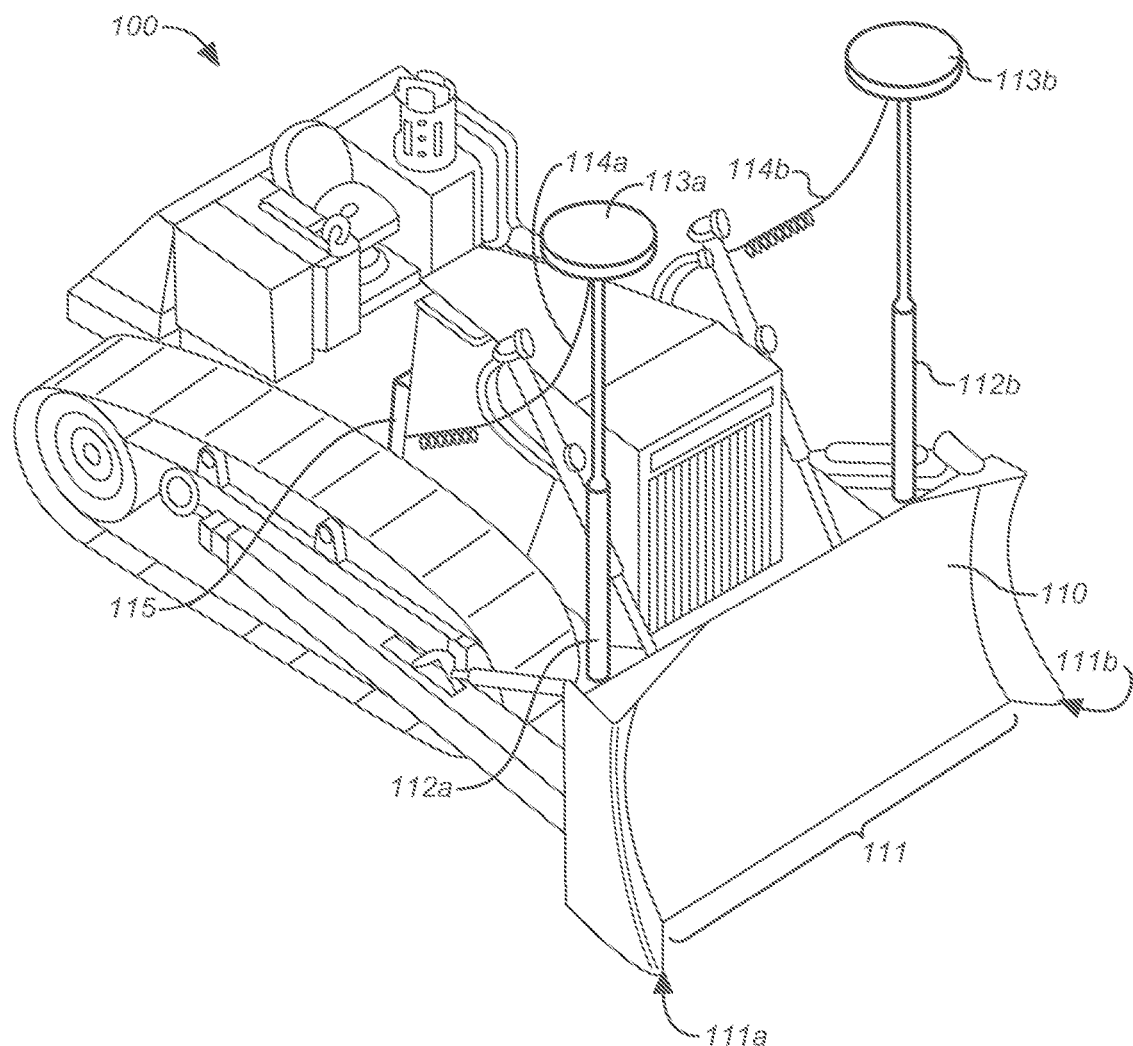
FIG. 1 shows a bulldozer using an exemplary prior art positioning system.
Figure 2:
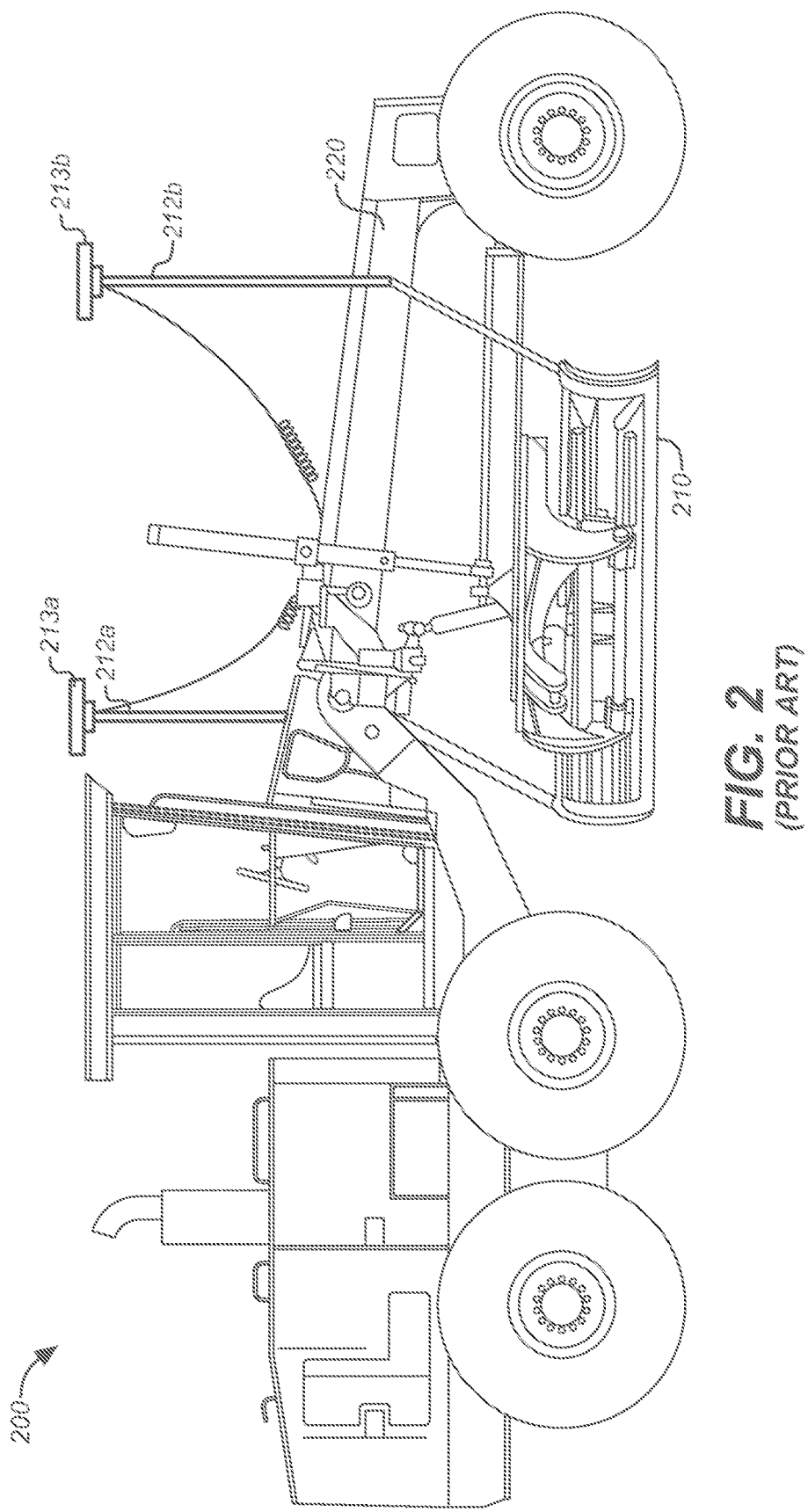
FIG. 2 shows a motor grader using an exemplary prior art positioning system.

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following Description of Embodiments, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

NOTATION AND NOMENCLATURE

Unless specifically stated otherwise as apparent from the following discussions, it is appreciated that throughout the present Description of Embodiments, discussions utilizing terms such as "automatically", "determining", "outputting", "generating", "providing", "receiving", "utilizing", "obtaining", "recognizing", "accessing", "detecting", "taking", "measuring", "scanning," or the like, often refer to the actions and processes of an electronic computing device/ system, such as a computing system, an electronic navigation device, and/or an electronic surveying device, among others. The electronic computing device/system manipulates and transforms data represented as physical (electronic) quantities within the circuits, electronic registers, memories, logic, processor(s), and/or components and the like of the electronic computing device/system into other data similarly represented as physical quantities within the electronic computing device/system or other electronic computing devices/ systems.

In the following discussion, implement refers to items such as the blade of a bulldozer or motor grader, the bucket of an excavator, the forks of a forklift, and the like.

Mobile machines which can use implements include, but are not limited to, a bulldozer, a motor grader, an excavator, a wheel loader, a skid-steer loader, a scraper, a trencher, a trimmer, a tractor with an attachment (e.g., a grading attachment), a paver (e.g., a concrete or an asphalt paver), a slip form concrete machine (e.g., a curb and gutter machine), a combine, a harvester, a seeder, a cultivator, a planter and the like. It is appreciated that the term "excavator" may refer to a standard excavator, a tilting bucket excavator, a rotating bucket excavator, as well as other configurations utilizing extra boom and stick components or front bucket configurations. While these particular mobile machines are recited, embodiments of the present invention are well suited to be implemented in a variety of mobile machines used in agricultural, industrial, construction, mining, military, commercial, and consumer applications.

Figure 3:
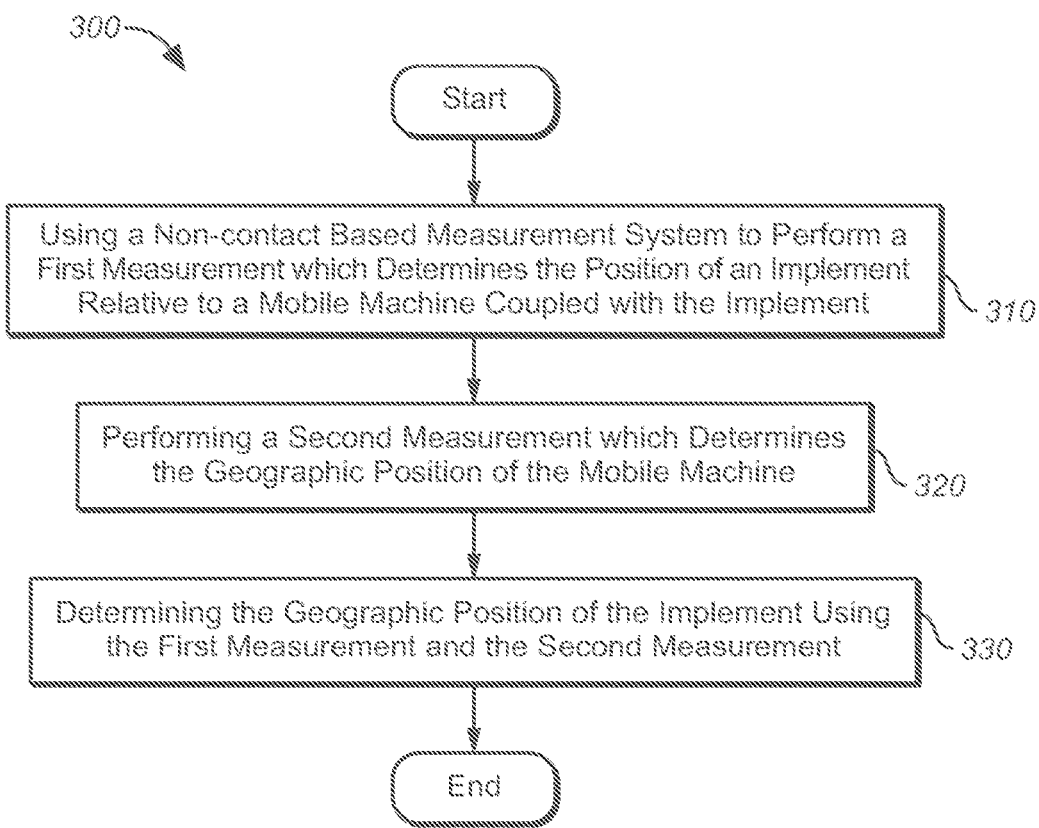
FIG. 3 is a flowchart of a method for performing non-contact based determination of the position of an implement in accordance with embodiments of the present invention.

FIG. 3 is a flowchart of a method for performing non-contact based determination of the position of an implement in accordance with embodiments of the present invention. In step 310 of FIG. 3, a non-contact based measurement system is used to perform a first measurement which determines the position of an implement relative to a mobile machine to which the implement is coupled. For the purposes of the invention described herein, a non-contact based measurement system refers to a measurement system which determines the position of an implement relative to a mobile machine to which it is coupled without requiring measurement of the position of each component comprising the mechanical linkage coupling the implement and the mobile machine.

As will be described in greater detail below, embodiments of the present invention determine the position of an implement such as the blade of a bulldozer or motor grader, the bucket of an excavator, or an implement using a measurement system which does not rely upon mechanical contact between a point of interest on the implement and the measuring instrument. For example, in embodiments of the present invention, determining the position of the machine's implement does not require measurement of the extension of each of the hydraulic cylinders used to control and manipulate the implement. In embodiments of the present invention, measurement of the distance and/or angle between a reference point on the mobile machine and a reference point on the implement is made.

In step 320 of FIG. 3, a second measurement which determines the geographic position and orientation of said mobile machine is performed. More specifically, embodiments of the present invention determine, in at least one dimension, the position of a reference point of a mobile machine. For example, measurement of the elevation of the mobile machine may be determined. Alternatively, the two dimensional geographic position (e.g., latitude and longitude) of the mobile machine may be determined or a combination of the elevation and two dimensional geographic position. While the present embodiment recites these examples specifically, it is appreciated that embodiments of the present invention are well suited for utilizing a variety of metrics and combinations thereof for determining the geographic position of the mobile machine.

Embodiments of the present invention use a position determining apparatus mounted on a mobile machine to determine the position of the mobile machine in at least one dimension (e.g., latitude, longitude, and elevation) or a combination thereof. Examples of mobile machines which can use embodiments of the present invention include, but are not limited to, a bulldozer, a motor grader, an excavator, a skid-steer loader, a scraper, a trencher, a trimmer, a tractor with an attachment (e.g., a grading attachment), a paver (e.g., a concrete or an asphalt paver), and a slip form concrete machine (e.g., a curb and gutter machine). It is appreciated that the term "excavator" may refer to a standard excavator, a tilting bucket excavator, a rotating bucket excavator, as well as other configurations utilizing extra boom and stick components or front bucket configurations. While these particular mobile machines are recited, embodiments of the present invention are well suited to be implemented in a variety of mobile machines used in agricultural, industrial, construction, mining, military, commercial, and consumer applications.

Embodiments of the present invention may utilize a variety of terrestrial-based position determining systems such as LORAN-C, Decca, radio beacons, etc. Embodiments of the present invention may utilize a commercially available terrestrial-based position determining system such as the UTS series manufactured by Trimble Navigation Ltd. of Sunnyvale Calif. Furthermore, the present invention is well suited to utilize future implementations of terrestrial-based position determining systems, e.g., the Rosum positioning technology. Additionally, embodiments of the present invention may utilize a variety of satellite-base position determining systems which can be utilized by embodiments of the present invention such as the Global Positioning System (GPS), Differential GPS (DGPS), Eurofix DGPS, the Global Navigation Satellite System (GLONASS), QZSS, BeiDou, Galileo, etc. Furthermore, the present invention is well suited to utilize future implementations of satellite-based position determining systems.

Embodiments of the present invention may also utilize position determining system which is located proximate to the mobile machine. In one embodiment, the present invention utilizes a Real-Time Kinematics (RTK) position determining system or a networked RTK system. RTK position determining systems typically use two or more communicatively coupled GPS receivers to determine a position of one receiver relative to the other receiver.

In a typical RTK system, a first GPS receiver is located at a known position, often a surveyor's landmark or benchmark, or an otherwise surveyed position, and the pseudorange data it collects is sent to the second GPS receiver, often referred to as a "rover," via a radio communications link. The rover is used to determine the relative position of desired points according to the needs of the survey effort. Thus there is a radio transmitter associated with the first receiver, called a reference receiver or a base station receiver, and a radio receiver at the rover. Pseudorange data from the satellites in view from the first receiver at the base station location is combined with data taken at the second rover receiver, and is processed at the rover according to well-known RTK methods to develop a position of the rover relative to the base station position. Embodiments of the present invention may adapt the RTK system wherein the roving GPS unit is mounted in the mobile machine.

Network RTK, also referred to as a "Virtual Reference Station system" typically uses three or more GPS reference stations to collect GPS data and extract information about the atmospheric and satellite ephemeris errors affecting signals within the network coverage region. Data from all the various reference stations is transmitted to a central processing facility, or VRS control center for Network RTK. Suitable software at the control center processes the reference station data to infer how atmospheric and/or satellite ephemeris errors vary over the region covered by the network.

The control center computer processor then applies a process which interpolates the atmospheric and/or satellite ephemeris errors at any given point within the network coverage area and generates a pseudorange correction comprising the actual pseudoranges that would be received at the specified base station location, now referred to as the Virtual Reference Station, and pseudorange corrections applicable to the region surrounding that location. The corrected pseudoranges calculated at the VRS control center are then delivered to the mobile machine. As will be discussed below, embodiments of the present invention may use other systems for determining the geographic position and orientation of the mobile machine. Other ground-based position determining systems used in accordance with embodiments of the present invention may use radio signals to determine the geographic position of a base station and an optical system (e.g., laser) to determine the position of the mobile machine relative to the base station. In another embodiment, a combination of a terrestrial-based position determining system and a satellite-based position determining system are used to determine the position of the mobile machine.

In embodiments of the present invention, the orientation (e.g., the direction, roll, pitch, yaw, or a combination thereof) of the mobile machine is determined as well its geographic position. As a result, the orientation of the implement can be derived as well. There are a variety of methods for determining the orientation of the mobile machine in accordance with embodiments of the present invention. These methods include, but are not limited to using a compass and/or one or more gyroscopes, tilt sensors, and/or accelerometers.

It is appreciated that steps 310 and 320 do not have to be performed in a specific order. That is, step 320 may precede step 310, or the steps may be performed simultaneously in accordance with embodiments of the present invention. Additionally, a plurality of measurements for determining the position of the implement may correspond to a single measurement of the geographic position of the mobile machine, or vice versa, in accordance with embodiments of the present invention.

In step 330 of FIG. 3, the geographic position and orientation of the implement is determined using the first measurement and the second measurement. In embodiments of the present invention, a control unit (e.g., mounted on the mobile machine) uses the first measurement of the position of the implement relative to a point on the mobile machine and the second measurement of the geographic position and orientation of the mobile machine to determine the geographic position and orientation of the implement. In so doing, the present invention accurately determines the geographic position and orientation of a point of interest on the implement such as the blade edge of a bulldozer, motor grader or the edge of a bucket of an excavator. More specifically, embodiments of the present invention may determine the geographic position of a point of interest on an implement without necessitating the use of blade mounted geographic position sensors coupled with the implement. Additionally, embodiments of the present invention determine the geographic position of a point of interest of the implement without requiring measurement of the position of each component comprising the mechanical linkage coupling the implement and the mobile machine. As a result, embodiments of the present invention do not restrict the range of motion of the implement being measured, can be readily installed as an after-market kit, and do not subject the components to less damage than conventional implementations.

Figure 4:
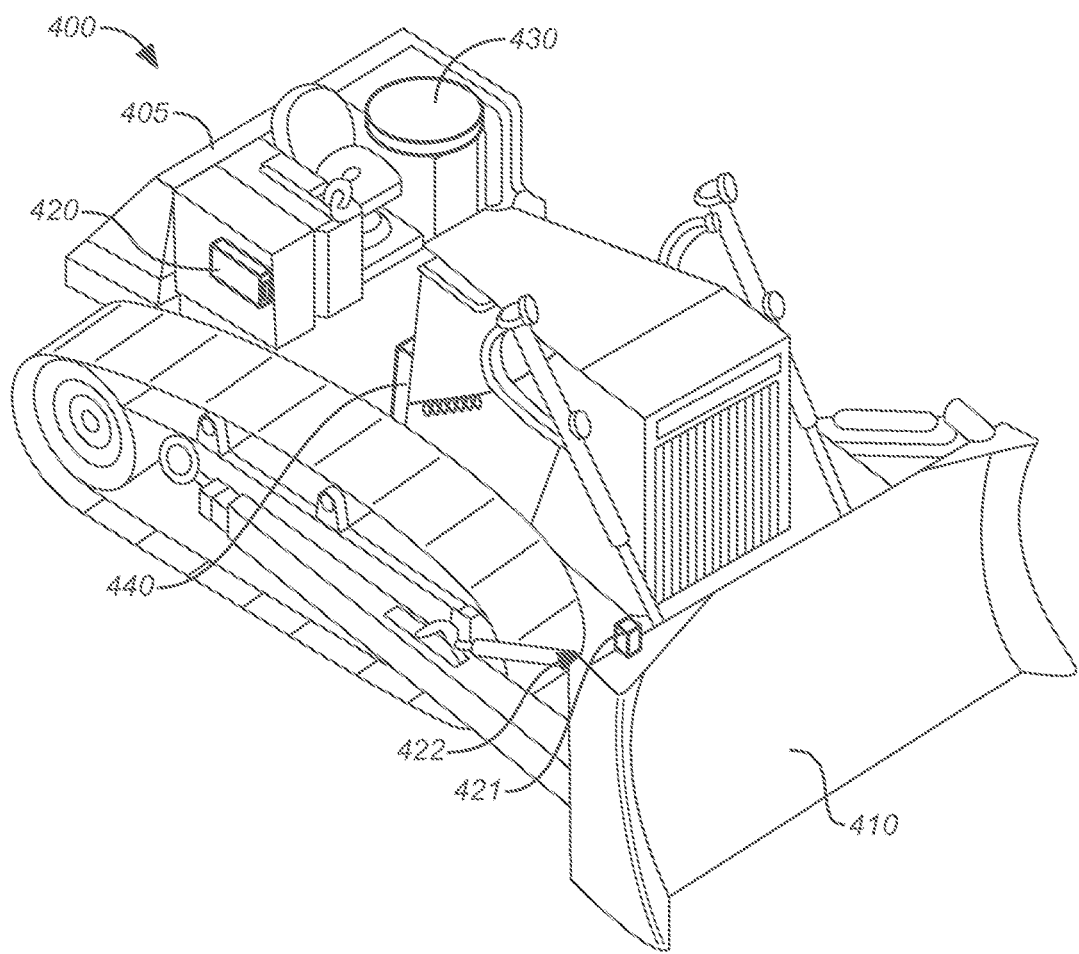
FIG. 4 shows a system for performing non-contact based determination of the position of an implement in accordance with embodiments of the present invention.

FIG. 4 shows a system 400 for performing non-contact based determination of the position of an implement in accordance with embodiments of the present invention. In the embodiment of FIG. 4, a non-contact based measurement system is used to determine the position of blade 410 relative to bulldozer 405. There are a variety of non-contact based measurement systems that can be used to determine the position of blade 410 in accordance with embodiments of the present invention.

In the embodiment of FIG. 4, an image recognition apparatus, comprising an optical receiver 420 coupled with bulldozer 405, and a visual indicator 421, is used to determine the position of blade 410 relative to bulldozer 405. In one embodiment, optical receiver 420 comprises a digital camera or one or more charged coupled devices (CCD). In this embodiment, optical receiver 420 monitors the position of visual indicator 421 and determines when it has moved from a first position to a second position. In embodiments of the present invention, visual indicator 421 may comprise a recognizable image such as a light emitter (e.g., a visible light, an infra-red emitter, one or more light emitting diodes (LEDs), etc.), a bar-code, a bulls eye or other graphic image, etc. Alternatively, visual indicator 421 may be an identifiable portion of blade 410 itself such as the upper right corner 422 of blade 410. When blade 410 is moved from a first position to a second position relative to bulldozer 405 (e.g., from a raised position to a lowered position), optical receiver 420 sends the position data of the blade to a control unit 440 which determines the position of working edge 411. This is possible because the position of working edge 411 is known with respect to visual indicator 421.

In embodiments of the present invention, determining the position of working edge 411 may comprise detecting the pixel position of visual indicator 421 at a first position using optical receiver 420 and detecting the pixel position of visual indicator 421 in a second position. Using this data, control unit 440 determines how far working edge 411 has moved by determining how many pixels separate the two images. In another embodiment, optical receiver 420 automatically tracks or aligns itself with visual indicator 421 using servo-motors. Control unit 440 determines the angular difference between a first position and a second position of camera 420 when blade 410 is moved. There are a variety of systems known in the art which use a camera to automatically track a moving visual target. Because the distances between optical receiver 420, visual indicator 421, and working edge 411 are known, the present invention can derive the position of working edge 411 relative to bulldozer 405 by using optical receiver 420 to track visual indicator 421.

System 400 also comprises a position determination system 430 for determining the geographic position and orientation of bulldozer 405. As discussed above with reference to FIG. 3, embodiments of the present invention may utilize a terrestrial-based, a satellite-based (e.g., GPS) position determination system, or a combination thereof. Additionally, the position determination system may be located on bulldozer 405 or at a location proximate to bulldozer 405.

In embodiments of the present invention, a RTK base station may be used to determine the geographic position of bulldozer 405. Embodiments of the present invention may also utilize a networked RTK system, also known as a "virtual reference station" or "VRS" system, to determine the geographic position of bulldozer 405 with a greater degree of precision than is possible using an un-aided GPS position fix. For example, an un-aided GPS unit can fix its geographic position with a resolution of approximately 10 meters. However, when the pseudorange data from a VRS control center is correlated with the initial position fix performed by bulldozer 405, a resolution of 1 centimeter over 10 kilometers is realized in the horizontal plane, and 2 centimeters over 10 kilometers is realized in the vertical plane is realized.

Another example of a position determination system located proximate to a mobile machine is described in International Patent Application number WO 99/28565, entitled "A Device and Method for Determining the Position of a Working Part," by Lars Eriksson and Mikael Hertzman, and incorporated as reference herein in its entirety. In the patent application a reference station is placed in proximity to a working machine. The geographic position of the reference station is determined and the reference station then automatically tracks the working machine as it moves. The working machine utilizes accelerometers to detect more rapid movements of the machine than might be detected by the reference station.

In another embodiment, the present invention uses a pair of laser reference stations which are located at a known distance from each other proximate to the mobile machine. The geographic position of the reference stations is determined and angle of intercept from both reference stations to a target point (e.g., a reference point on bulldozer 405) is determined. Using this information, it is possible to derive the distance from the reference stations to the target point, thus determining the geographic position of the target point. Embodiments of this type of position determination system are known in the art and may be utilized in embodiments of the present invention.

For clarity, it will be assumed that in the embodiment of FIG. 4 position determination system 430 comprises a GPS unit mounted on bulldozer 405 to determine the geographic position of the bulldozer. It is appreciated that embodiments of the present invention position determination system 430 determines the geographic position of bulldozer 405 in at least one dimension. That is, the latitude, longitude, elevation, or a combination thereof of a reference point on bulldozer 405 may be determined in embodiments of the present invention.

As described above, system 400 further comprises a control unit 440 for determining the geographic position and orientation of working edge 411 using the data from the position determination system and the non-contact based measurement of the position of blade 410. In embodiments of the present invention, this functionality may be incorporated in GPS unit 430, or performed by a separate component (e.g., control unit 440). Additionally, components for determining the orientation of bulldozer 405 may be incorporated in control unit 440, GPS unit 430 or a separate unit (not shown) which is communicatively coupled with control unit 440.

As described above, system 400 performs non-contact based determination of the position of an implement (e.g., blade 410 of FIG. 4). More specifically, the geographic position of working edge 411 is determined by the present invention without the necessity of measuring the position of each component coupling working edge 411 with bulldozer 405. Additionally, system 400 is a does not require mounting components of the system on masts coupled with bulldozer 405 or blade 410. As a result, the components of system 400 are not as exposed to damage from dirt, branches, brush, etc., than is realized using present systems.

Embodiments of system 400 may also be implemented without restricting the range of motion of the implement or the mobile machine utilizing the implement. As described above, mast mounted sensors can physically restrict the range of motion of the implement for certain types of machines such as motor graders. Additionally, operators of some machines may be reluctant to use the machines in heavy brush or wooded areas to avoid damaging the exposed position sensors. Embodiments of system 400 may be installed upon bulldozer 405 as an after market kit. In other words, camera 420, visual indicator 421, position determination system 430, and control unit 440 may be purchased separately from bulldozer 405 and installed after bulldozer 405 has been manufactured.

FIGS. 5A and 5B show a non-contact based measurement system 500 used in accordance with embodiments of the present invention. In one embodiment of FIGS. 5A and 5B, system 500 is a light-based measurement system comprising an emitter/detector 510 coupled with mobile machine 520 (e.g., a bulldozer, motor grader, excavator, etc.), and a reflector 530 coupled with implement 540 (e.g., a blade of a bulldozer or motor grader, or the bucket of an excavator). In embodiments of the present invention, light in the visible spectrum or non-visible spectrum can be used in system 500. For example, in one embodiment, emitter/detector 510 may comprise a laser system which measures changes in the position of reflector 530 when implement 540 is moved from a first position to a second position relative to mobile machine 520. In another embodiment, system 500 uses, for example, light infra-red light to measure the position of implement 540.

In embodiments of the present invention, emitter/detector 510 detects a change in the angle to reflector 530 when implement 540 is moved relative to mobile machine 520. For example, in one embodiment emitter/detector 510 detects movement of implement 540 by detecting the change in the incidence angle of light reflected back from reflector 530. In another embodiment of the present invention, emitter/detector 510 is a servo-controlled optical unit which automatically aligns with reflector 530 in response to changes in the position of implement 540. The alignment of emitter/detector 510 can be used to determine position of implement 540 relative to mobile machine 520.

Alternatively, emitter/detector 510 may detect a change in the distance to reflector 530 when implement 540 is moved relative to mobile machine 520. In embodiments of the present invention, emitter/detector 510 is a distance determination unit which detects changes in the distance to reflector 530 when implement 540 is moved from a first position to a second position relative to mobile machine 520. In embodiments of the present invention, determining the distance between emitter/detector 510 and reflector 530 may be accomplished using light (e.g., a laser system), sound (e.g., ultrasonic), or radio systems. In another embodiment, emitter/detector 530 can detect a change in both the distance and angle to reflector 530 when implement 540 is moved relative to mobile machine 520.

In embodiments of the present invention, reflector 530 comprises a retro reflector. Retroreflectors are sometimes called "corner cubes" because the reflecting surfaces are typically three mutually perpendicular faces like the corner of a cube. Light entering a retroreflector is reflected back 180° and parallel to the original beam, over a wide range of angles. With reference to FIG. 5A, light from emitter/detector 510 is reflected back 180 and is then detected by emitter/detector 510. While the present embodiment recites a retro reflector specifically, embodiments of the present invention may utilize a variety of reflecting devices or targets to determine the position of implement 540.

It is appreciated that in embodiments of the present invention more than one emitter/detector 510 and/or reflector 530 may be used to determine the position of implement 540. For example, when used to measure the position of the blade of a motor grader, system 500 may use a plurality of emitter/detectors and reflectors to determine the three dimensional position of the blade relative to the motor grader. In one embodiment, more than one emitter/detector may be associated with a single reflector or vice versa. Alternatively, embodiments of the present invention may use one system to determine a change in the angle between an emitter/detector and its associated reflector and a second system to determine a change in the distance between a second emitter/detector and its associated reflector.

Referring now to FIG. 5B, an emitter 550 is coupled with implement 540 and detector 560 is coupled with mobile machine 520. In embodiments of the present invention, emitter 550 may comprise a laser emitter, an infra-red emitter, a light emitting diode, a radio emitter, a sound emitter, etc. Embodiments of the present invention use detector 560 to determine when implement 540 is moved from a first position to a second position relative by detecting the difference in incidence angle from emitter 550, or the distance between emitter 550 and detector 560. In another embodiment of the present invention, detector 560 is a servo-controlled optical unit which automatically aligns with emitter 550 in response to changes in the position of implement 540. The alignment of detector 560 can be used to determine position of implement 540 relative to mobile machine 520. In another embodiment, detector 560 detects a phase difference in light from emitter 550 when implement 540 is moved from a first position to a second position relative to mobile machine 520.

In other embodiments of the present invention, system 500 comprises a sound-based measurement apparatus. Referring again to FIG. 5A, in embodiments of the present invention emitter/detector 510 is coupled with mobile machine 520 and emits an audible signal (e.g., an ultra-sonic signal) which is reflected by reflector 530 coupled with implement 540. For example, when implement 540 is moved from a first position to a second position, a change in the time of flight for the audio signal allows determining the position of implement 540 relative to mobile machine 520. For example, emitter/detector 510 will emit a pulse of sound and when that sound is reflected back to the sender the time is measured and half the time multiplied by the seed of sound gives the distance. Also in parallel there is a sound pulse travelling a fixed distance so that the speed of sound can be very accurately determined for the atmospheric conditions (temperature, pressure and humidity) which affect the speed of sound.

In one embodiment, the signal is one way, and in another embodiment a reflector is used. For example, in a one way case, 530 would be the transmitter and 510 the receiver, or vice versa. In another embodiment, emitter/detector 510 comprises a directional microphone which can automatically align with the reflected signal from reflector 540 (e.g., using servo-motors to track the strongest signal).

Referring again to FIG. 5B, an audio emitter 550 is coupled with implement 540 and detector 560 is coupled with mobile machine 520. Embodiments of the present invention use detector 560 to determine when implement 540 is moved from a first position to a second position relative by detecting the time of signal flight or signal strength of the audio signal from emitter 550. In another embodiment of the present invention, detector 560 is a servo-controlled directional microphone which automatically aligns with emitter 550 in response to changes in the position of implement 540. The alignment of detector 560 can be used to determine position of implement 540 relative to mobile machine 520. For example, emitter 550 is triggered by a signal over a wire or via radio or from a synchronized clock, that detector 560 also receives and then the time of sound travel has a base from which it can be determined.

In embodiments of the present invention, audio emitter 550 is coupled with mobile machine 520 and detector 560 is coupled with implement 540. In another embodiment, the rolls of 550 and 560 may be reversed. That is, audio emitter 550 is coupled with implement 540 and detector 560 is coupled with mobile machine 520.

Figure 6:
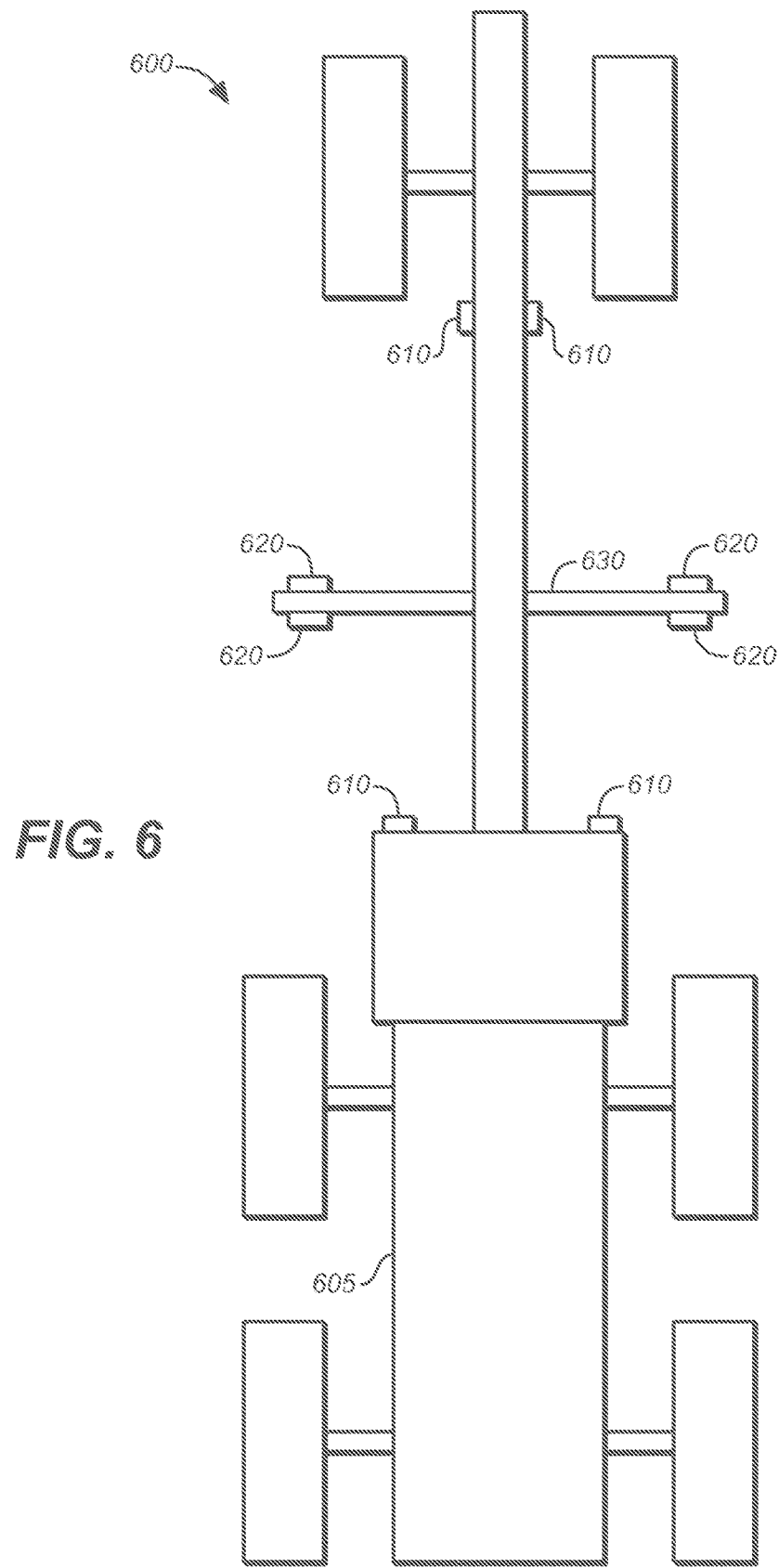
FIG. 6 shows a non-contact based measurement system implemented on a motor grader in accordance with embodiments of the present invention.

FIG. 6 shows a non-contact based measurement system 600 implemented on a motor grader in accordance with embodiments of the present invention. In one embodiment, a plurality of emitter/detectors 610 are coupled with motor grader 605. Additionally, a plurality of reflectors 620 are coupled with blade 630. In embodiments of the present invention, emitter/detectors 610 and reflectors 620 may comprise either a light-based or sound-based measurement system as described above with reference to FIGS. 5A and 5B. Additionally, reflectors 620 and emitter/detectors 610 may detect a change in angle, a change in distance, or both when blade 630 is moved relative to motor grader 605. While the embodiment of FIG. 6 shows 4 emitter/detectors 610, embodiments of the present invention may utilize more or fewer emitter/detectors based upon the system requirements.

In another embodiment, a plurality of detectors 610 are coupled with motor grader 605 and a plurality of emitters 620 are coupled with blade 630. As discussed above with reference to FIGS. 5A and 5B, detectors 610 and emitters 620 may comprise a light-based or sound-based measurement system in embodiments of the present invention. Additionally, emitters 620 and detectors 610 may detect a change in angle, a change in distance, or both when blade 630 is moved relative to motor grader 605. While the embodiment of FIG. 6 shows 4 detectors 610, embodiments of the present invention may utilize more or fewer detectors based upon the system requirements. Embodiments of the present invention may also utilize an image recognition apparatus as described above with reference to FIG. 4 on a motor grader.

Figure 7:
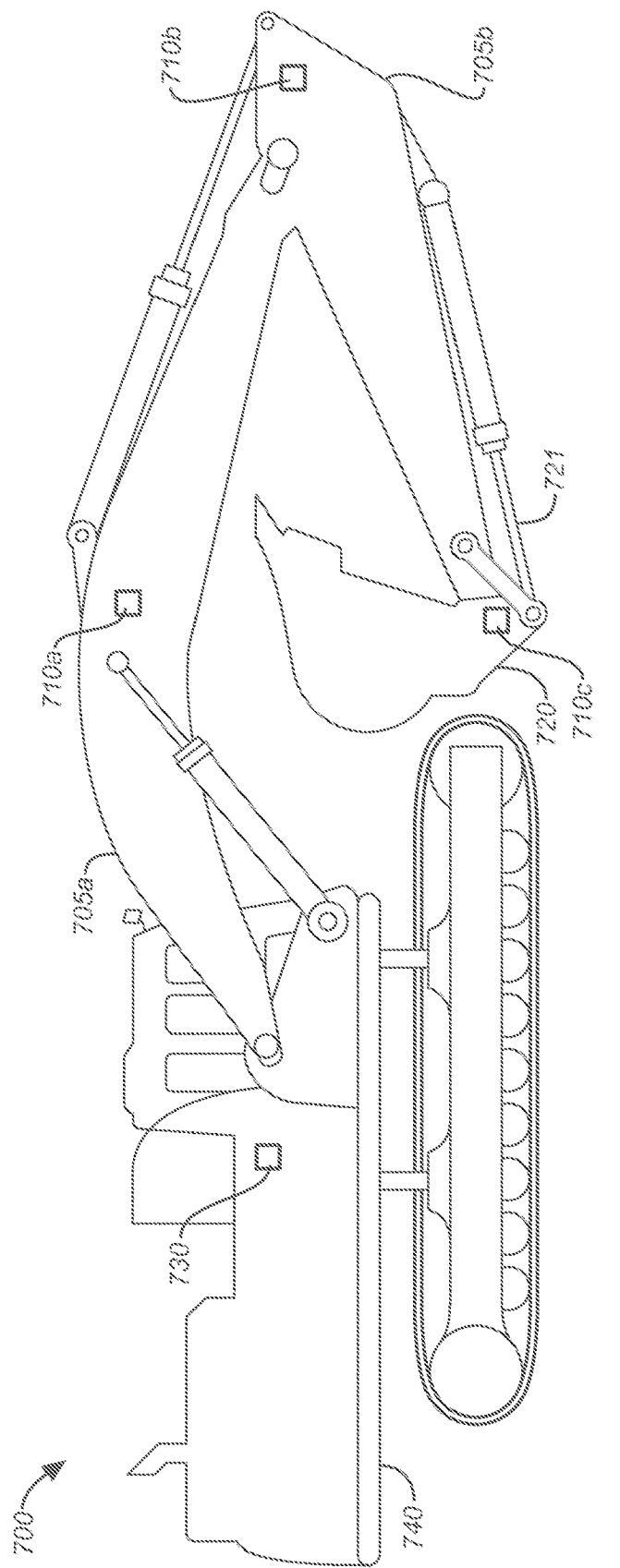
FIG. 7 shows an excavator using a non-contact based measurement system in accordance with embodiments of the present invention.

FIG. 7 shows an excavator using a non-contact based measurement system in accordance with embodiments of the present invention. In the embodiment of FIG. 7, a plurality of sensors (e.g., 710a-710c) are coupled with excavator 700. In embodiments of the present invention, each of sensors 710a-710c detects changes in the position of the component of the boom to which the respective sensor is attached. For example, in FIG. 7, sensor 710a is coupled with arm 705a, gravity sensor 710b is coupled with arm 705b, and gravity sensor 710c is coupled with bucket 720. As bucket 720 is moved, sensors 710a-710c detect the angular changes relative to the ground to determine the extension of arm 705. In an embodiment of the present invention, sensor 710c comprises a cylinder extension sensor for determining the position of bucket 720 by determining the extension of the hydraulic cylinder 721. Using an extension sensor is advantageous in some situations such as when bucket 720 may be immersed in water or below the ground level (e.g., when digging a trench). In such an instance, the operation of a light-based or sound based measurement apparatus may be hindered due to discontinuities in the line of sight between bucket 720 and excavator 700. In one embodiment, the position data from cylinder extension sensor 710c as well as from sensor(s) 710a and/or 710b is sent to control unit 730 wirelessly. It is appreciated that position data from each of arm 705a, arm 705b, and bucket 720 are not necessary for control unit 730 to determine the position of bucket 720. Because the geometry of the arms which couple body 740 with bucket 720 is known, the position of the working edge of bucket 720 can be determined using data describing the extension of hydraulic cylinder 721 and, for example, the position of sensors 710a and 710b. An additional sensor (not shown) may be used to detect horizontal rotation of body 740. In other embodiments of the present invention, the angle of extension of one of the arms 705a or 705b or bucket 720 may be determined using a tilt sensor or an angle extension sensor and transmitted to control unit 730.

Figure 8:
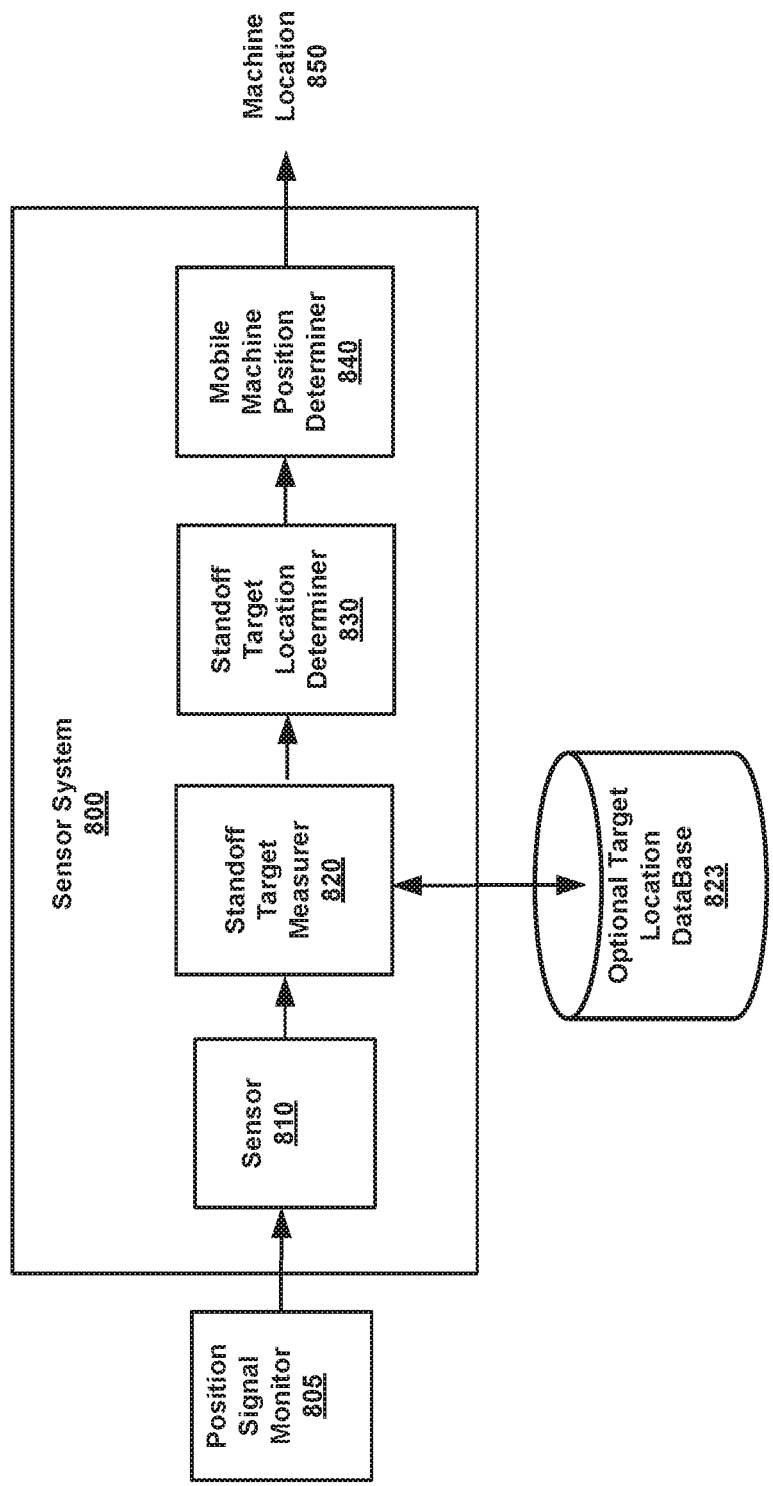
FIG. 8 is a block diagram of a sensor system for auto recognition of at least one standoff target to determine position information for a mobile machine in accordance with one embodiment of the present invention.

Auto Recognition of at Least One Standoff Target to Determine Position Information for a Mobile Machine With reference now to FIG. 8, a block diagram of a sensor system 800 for auto recognition of at least one standoff target to determine position information for a mobile machine 520 is shown. In general, sensor system 800 may be a control unit such as unit 730. As described herein, sensor 810 may be used to locate an implement or portion thereof (such as working edge 411 of blade 410 in FIG. 4), on the mobile machine 520, such as is described in detail herein. However, in addition to capturing a portion of the implement, the sensor's field of view is expanded herein to monitor an area that is larger than implement 540. In general the monitoring may be visual, audio, laser, infra-red, radio wave, etc.

One embodiment takes advantage of the expanded field of view by providing standoff targets mounted in an area of interest, such as separate from but in the operating environment of a mobile machine, such as mobile machine 520. In one embodiment, the standoff targets are mounted on stationary objects, such as a post, a rock, a wall, and the like. In another embodiment, the standoff targets are mounted on mobile objects, such as another mobile device similar to those discussed herein. In yet another embodiment, the standoff targets may be mounted on a mixture of stationary and mobile objects.

In addition, the standoff targets may be passive or active. For example, a passive standoff target may have a unique passive identifier such as a unique optical pattern, unique height (as compared to other standoff targets), or the like. In general, a passive standoff target may be or include a distinct piece of metal, a bar code, etc.

An active standoff target may utilize a laser diode light bulb, light emitting diode, an infra-red identifier, a unique light pattern identifier, a personal area network identifier (e.g., a Bluetooth identifier), a radio frequency identification (RFID) tag or other active type of output for unique active identification purposes. By utilizing the expanded field of view, the standoff target or targets may be utilized by the sensor system 800 to determine position information for the sensor system 800.

For example, a moving machine is operating in conjunction with a NSS and, as described herein, an implement 540 is also monitored. As such, the position of the implement 540 is also known. However, when the mobile machine moves into an area with weak or non-existent NSS coverage, such as under a bridge, behind a hill, in an area of signal reflection, or the like, the accuracy of the position information for the mobile machine and the implement being monitored is reduced. By expanding the field of view of the sensor system 800 to an area larger than just the implement and by providing a number of standoff targets in the area of reduced NSS coverage, an alternate way to determine position of the mobile machine is realized.

Figure 10A:
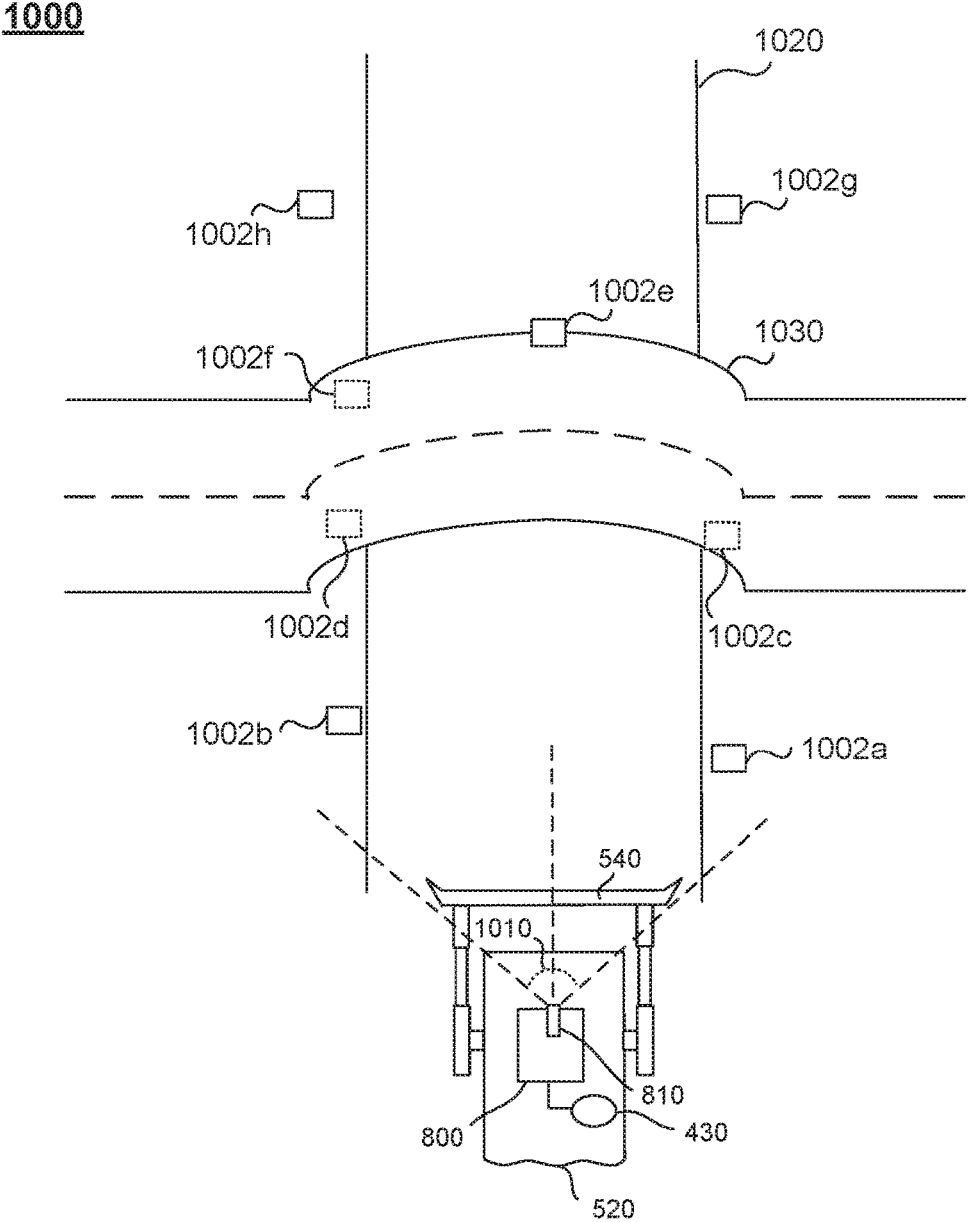
FIG. 10A is an overhead view diagram of a mobile machine operating location with an area of low NSS signal quality in accordance with one embodiment of the present invention.

In one embodiment, the standoff target or targets are placed in an area having reduced NSS coverage, for example around a roadway 1020 underpass, such as underpass 1030 of FIG. 10A described herein. In one embodiment, the location of the standoff targets may be determined by sensor system 800 when the NSS is available on the moving machine. In another embodiment, the locations of the standoff targets may be surveyed for precision during their emplacement.

Additionally, as described herein, each target may have a unique identifier. For example, for a passive standoff target the unique identifier may be a visual pattern. The location for the standoff target may then be looked up in a database (e.g., database 823) that has location information of the standoff target correlated with the unique identifier. However, in another embodiment, the passive standoff target may also provide its own location information. For example, the visual pattern on the standoff target may include a q-code, bar code, or the like that would contain location information for the standoff target that is encoded in the q-code, bar code, or the like when the standoff target is emplaced.

In an active standoff target the unique active identifier may include flashing lights in a code, broadcast a standoff target identifier, or the like. In one embodiment, the broadcast may only contain a unique identifier and sensor system 800 would access a database (e.g., database 823) to find the location information of the standoff target correlated with the unique identifier. However, in another embodiment, the active standoff target may provide location information in its broadcast. For example, the flashing code, broadcast transmission, or the like would contain location information for the standoff target that is stored in the standoff target when it is emplaced.

In general, the location information for a standoff target may be latitude, longitude, altitude/elevation, etc. By using this location information from standoff targets emplaced in areas of reduced NSS coverage, sensor system 800 is capable of monitoring and determining the position of the mobile machine 520 while also keeping track of position implement 540 (in the manner previously described herein).

In one embodiment, sensor system 800 includes a sensor 810, a standoff target measurer 820, an optional target location database 823, a standoff target location determiner 830 and a mobile machine position determiner 840. In addition, sensor system 800 may receive information from a position signal monitor 805. For example, position signal monitor 805 recognizes a degradation of a position signal being used to provide location information to mobile machine 520 and provides a signal to sensor 810 to begin automatically scanning for standoff targets and/or for mobile machine position determiner 840 to use the locations of identified standoff targets in determining the position of mobile machine 520.

In general, sensor 810 may be one or more types of sensors such as, but not limited to, an optical sensor such as optical receiver 420 described herein, a sound based sensor system such as emitters 610 which are described in FIGS. 5A and 5B, or a plurality of sensors such as 710. In one embodiment, sensor 810 may include one or more cameras for locating the at least one standoff target. For example, the camera(s) for sensor 810 may be mounted in such a way to give a 120° field of view from either side in order to capture a full 180° view from the forward face of the mobile machine 520. In another embodiment, the camera could be a single dome-type with multiple lenses which would allow for up to a 360° view.

Standoff target measurer 820 calculates a distance and direction between the mobile machine 520 and the at least one standoff target. For example, standoff target measurer 820 may use photogrammetry, triangulation, roundtrip time of flight of sound or light, etc. to calculate a distance between the mobile machine 520 and the standoff target.

In some embodiments, when locations of one or more standoff targets is/are not known a priori, standoff target location determiner 830 determines the position of the at least one standoff target which can then be stored in optional target location database 823. In another embodiment, upon receiving a standoff target identifier, standoff target location determiner 830 will access target location database 823 to determine the location of the standoff target. In another embodiment, standoff target location determiner 830 will determine the location information for the standoff target from the standoff target identifier. For example, the standoff target identifier may be a broadcast signal, or visual identifier that includes the location information of the standoff target therein.

In one embodiment, when the standoff target is placed in a non-surveyed location, standoff target location determiner 830 may utilize the NSS position information of the mobile machine 520 along with the distance and direction information from standoff target measurer 820 to calculate the location of the standoff target. This location information in conjunction with the standoff target identifier may be added to target location database 823.

In another embodiment, when the standoff target is placed in a non-surveyed location, standoff target measurer 820 will perform two or more different measurements to the standoff target over a known time interval. Standoff target location determiner 830 will utilize the known positions of 830 along with the distance moved during the known time interval and two or more different measurements provided by standoff target measurer 820 to perform an angular displacement change to determine location of the standoff target. Once the location of the standoff target is determined it can be stored in a location such as optional target location database 823.

In another embodiment, standoff target location determiner 830 will utilize distance and distance intersections to determine the location of the standoff target. Although two or more different measurements are discussed, the present technology is well suited to performing tens, hundreds or even thousands of measurements to determine an average position of the standoff target.

Mobile machine position determiner 840 utilizes the location information for the standoff target and the distance and direction between mobile machine 520 and the standoff target to determine position information for mobile machine 520. Moreover, as additional standoff targets are identified and the distance and direction between the mobile machine 520 and the additional standoff targets is determined, the accuracy of the location information for mobile machine 520 will increase. For example, utilizing the location information in conjunction with the distance and direction information for at least three different standoff targets, mobile machine position determiner 840 would be able to determine latitude, longitude and altitude information for mobile machine 520.

Figure 9:
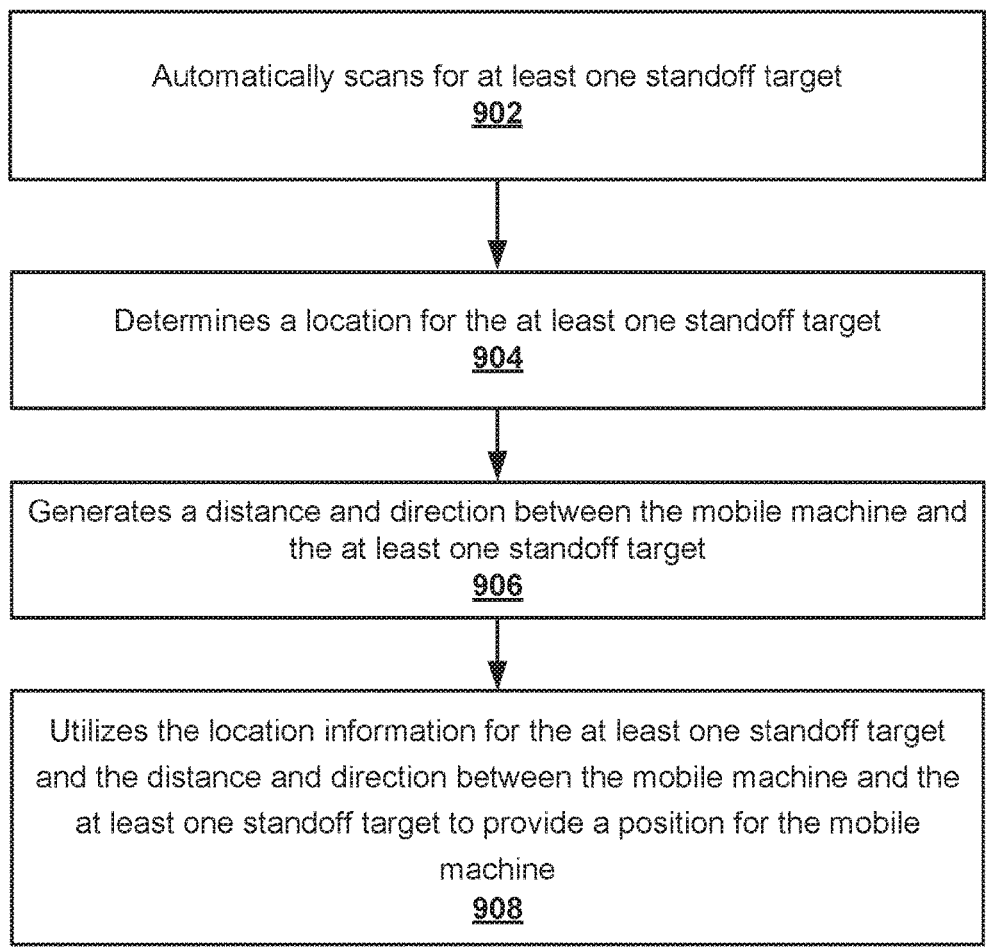
FIG. 9 is a flowchart of a method for auto recognition of at least one standoff target to determine position information for a mobile machine in accordance with one embodiment of the present invention.

With reference now to FIG. 9, a flowchart 900 of a method for auto recognition of at least one standoff target to determine position information for a mobile machine 520 is shown. One example of an area of interest for placing standoff targets would be low NSS signal quality areas. By way of example and not of limitation, some areas which may have low NSS signal quality include areas such as under a bridge, behind/near a hill, between tall buildings, beneath a canopy of trees, and the like.

In one embodiment a position signal monitor 805 recognizes a degradation of a position signal being used to provide location information to mobile machine 520. The position signal monitor 805 may use a position signal selected from the group consisting of either a navigation satellite system (NSS) or an inertial measurement unit (IMU). When the position signal monitor 805 recognizes a degradation of the position signal, the position signal monitor 805 will signal sensor 810 to automatically begin searching for standoff targets and/or for mobile machine position determiner 840 to use the locations of identified standoff targets in determining the position of mobile machine 520.

FIG. 10A is a diagram 1000 illustrating one such area of low NSS signal quality. Diagram 1000 includes a mobile machine 520, sensor system 800 with sensor 810 which has field of view 1010, position determination system 430, roadway 1020, bridge 1030 and standoff targets 1002a-1002h. In general, the standoff targets 1002a-1002h may be one or a combination of passive and active targets. For example, a passive standoff target may be a piece of metal, a bar coded object or some other identifiable object. In contrast, an active standoff target may be of similar construction but will also utilize infra-red, ultra violet, light emitting diode(s), wireless personal area network signals (e.g., Bluetooth or the like), Radio Frequency Identification (RFID), or the like to actively provide identification.

In one embodiment, sensor 810 of sensor system 800 is positioned in a way to scan a field of view of the direction of travel of a mobile machine. In some embodiments, this field of view overlaps and encompasses an implement, such as implement 540 that is coupled with the mobile machine. For, example, the field of view of view may be a 120 degree field of view, a 180 degree field of view, a 360 degree field of view, or field of view of other dimension that expands beyond just the implement attached to the mobile machine. In general, when mobile machine 520, traveling along roadway 1020, passes under bridge 1030 the position signal from position determination system 430 will be degraded or lost, and thus a position determined from these signals may also be degraded or lost. By utilizing one or more of standoff targets 1002a-1002h, the position of mobile machine 520 will be sustained. In addition, sensor system 800 will be able to perform the additional standoff target scanning while also continuing to monitor the location of implement 540 using one or more of the methods described herein.

With reference now to 902 of FIG. 9 and to FIG. 10A, one embodiment automatically scans for at least one standoff target. As described herein, sensor 810 may be used to locate an implement 540 on the mobile machine 520, such as described in detail herein. However, in addition to capturing a portion of the implement 540, the sensor's field of view is expanded to monitor an area that is larger than implement 540. In general the monitoring may be visual, audio, laser, infra-red, radio wave, etc. One embodiment takes advantage of the expanded field of view by automatically scanning for standoff targets 1002a-1002h mounted in the area of interest.

Referring now to 904 of FIG. 9, one embodiment determines a location (to include determining location information in two or three dimensions) for the at least one standoff target. In one embodiment, the location of the standoff target, e.g., standoff target 1002a is known via survey. That is, when standoff target 1002a is placed, a survey of its location is performed and the location (e.g., the determined two or three dimensional location information) is stored in a database such as target location database 823.

In another embodiment, the standoff target is placed in a non-surveyed location. In one embodiment, to determine the location of the standoff target, e.g., standoff target 1002a, at least two photos of the target are taken at two different locations over a known distance traveled between the different locations. Photogrammetry, such as using angular displacement change for the distance traveled, is used to determine the location of the at least one standoff target 1002a. Once determined, the location of the at least one standoff target may be stored in target location database 823 for current and future use.

In yet another embodiment, the standoff target may include its location information. For example, the visual pattern on the standoff target may include a q-code, bar code, or the like that would contain location information for the standoff target. Similarly, in an active standoff target may broadcast a unique identifier that may include location information therewith. For example, the flashing code, broadcast transmission, or the like would contain location information for the standoff target.

With reference now to 906 of FIG. 9, one embodiment generates a distance and/or direction between the mobile machine 520 and at least one of the standoff targets 1002a-1002h. For example, standoff target measurer 820 may use photogrammetry or triangulation to calculate a distance between the mobile machine 520 and the standoff target. In another embodiment, the distance may be determined via radar, Lidar (Light detection and ranging), RFID, and other range measurement technology. The direction may be determined via a compass heading, or other direction sensing technology.

Referring now to 908 of FIG. 9, one embodiment utilizes the location information for the at least one standoff target and the distance and direction between the mobile machine 520 and the at least one standoff target to provide a position for the mobile machine 520.

In another embodiment auto recognition of at least three standoff targets is utilized to determine position information for mobile machine 520. In yet another embodiment, the known location, distance and direction one or more (in some embodiments of at least three) standoff targets along with the last reliable position of the mobile machine 520 is used to calculate location information for mobile machine 520.

Measurement Examples

Figure 10B:
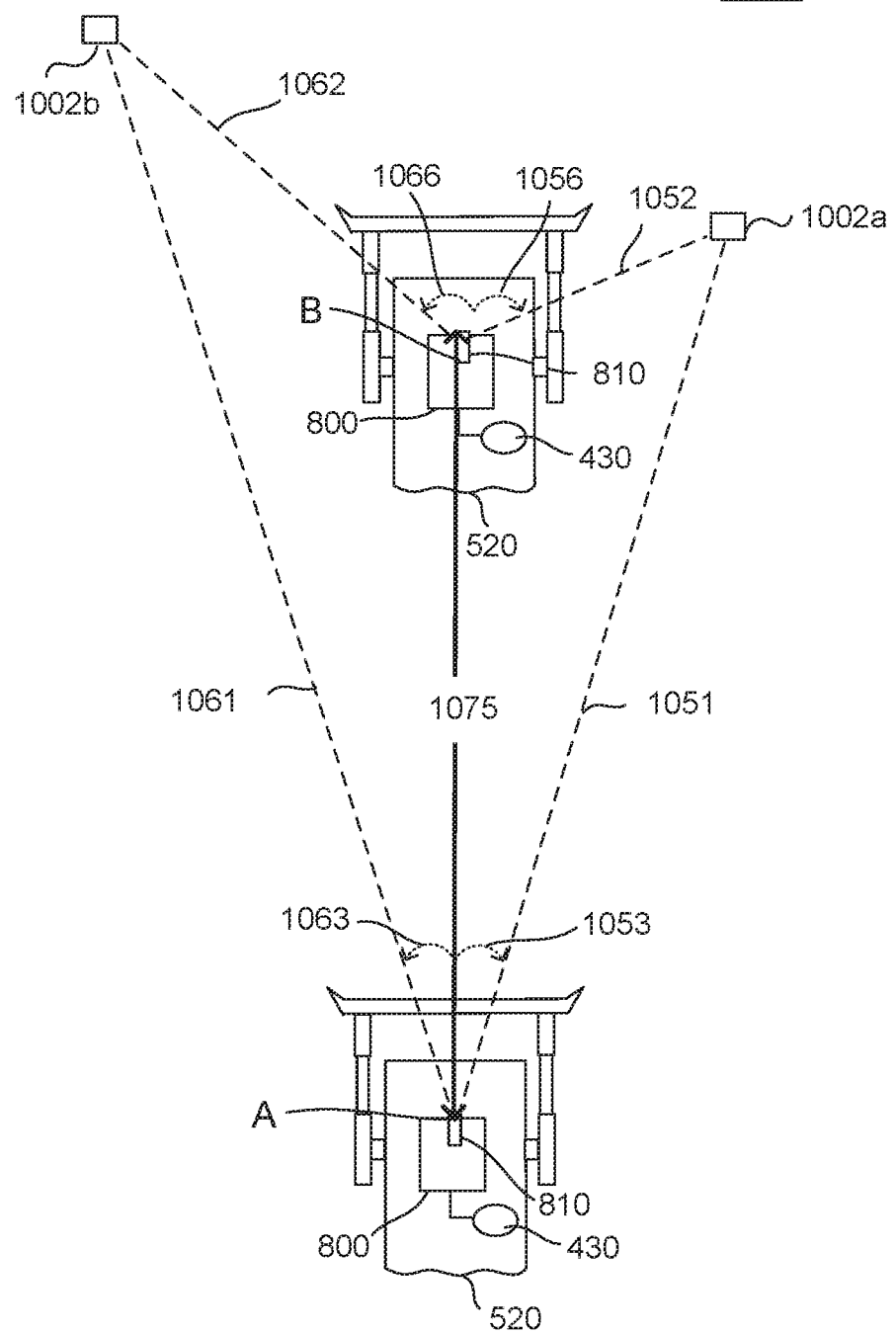
FIG. 10B is an overhead view diagram illustrating a mobile machine in conjunction with a standoff target for position determination in accordance with one embodiment of the present invention.

With reference now to FIG. 10B, an overhead view 1050 illustrating a mobile machine in conjunction with a standoff target for position determination in accordance with one embodiment of the present invention. In general, mobile machine 520 of FIG. 10B may be any of the number of mobile machines described herein. For purposes of clarity, mobile machine 520 is similar to that shown in FIG. 10A. Similarly, standoff targets 1002a and 1002b are also described herein and the discussion is not repeated for purposes of clarity. Moreover, as described herein, distance measurements such as 1051, 1052, 1061 and 1062 may be determined via radar, Lidar, RFID, and other range measurement technology. Direction, or bearings 1053, 1056, 1063 and 1066, may be determined via a compass heading or other direction sensing technology.

The following description discusses the different methods for determining position information for one or more mobile machine(s), such as mobile machine 520, and one or more standoff target(s), such as standoff target 1002a. For example, in different embodiments determining the target position is accomplished by determining distance and direction to the target; distance and travel between two or more machine locations; direction and travel between two or more machine locations; direction from a machine location and distance from another machine location; a combination of distances from and directions to a target from one or more machine locations; and the like.

Similarly, in different embodiments determining the machine position is accomplished by determining distance and direction from one or more targets; distance from two or more targets; direction to two or more targets; distance from one target and direction to one target; a combination of distances from and/or direction to one or more targets; and the like. In another embodiment, target elevation can be determined by a vertical angle from one or more machine locations and similarly, mobile machine elevation is determined by a vertical angle to one or more targets.

For purposes of clarity, the following description provides a number of examples for performing the measurements. However, the examples are meant to be illustrative and not exhaustive. In each example, it should be appreciated that the measurement determinations may be performed between one or more mobile machines, one or more standoff targets 1002a, or a combination of mobile machines and standoff targets. Moreover, where a single device is discussed, it should be appreciated that a number of devices may be used to perform additional measurements over and above the amount described. In addition, although two or more different measurements are discussed herein, the present technology is well suited to performing tens, hundreds or even thousands of measurements. In addition, the additional measurements can be used to determine an average position of the one or more mobile machines or the one or more standoff targets.

Non-Surveyed Standoff Target Location Determination

To determine the location of a standoff target that has not been placed in a surveyed location, at point A, sensor system 800 takes a bearing 1053 to standoff target 1002a. In one embodiment, bearing 1053 may include azimuth measurements. Sensor system 800 also takes a distance 1051 measurement. Accurate location from position determination system 430 is used in conjunction with the distance 1051 and bearing 1053 information to provide location information for standoff target 1002a. Once determined, the position information for standoff target 1002a can then be stored such as in target location database 823. When mobile machine 520 moves to a new location, such as point B, the distance 1052 and bearing 1056 to standoff target 1002a can be measured again. If position determination system 430 continues to have good location information, another determination of the location of standoff target 1002a can be performed. In one embodiment, the determined locations for standoff target 1002a may be compared and contrasted to provide further accuracy of standoff target 1002a location. The distance and bearing calculations may be performed at pre-defined distance intervals, at user selected intervals, over pre-defined time intervals, and the like.

In another embodiment, if the distance information is known, e.g., distance 1061 from point A and 1062 from point B, but the bearings are not known, a geometrical method such as trilateration is used to determine the location of standoff target 1002b. For example, at point A the distance from mobile machine 520 to standoff target 1002b would result in a first circle of radius 1061 upon which standoff target 1002b may be located. At point B the distance from mobile machine 520 to standoff target 1002b would result in a second circle of radius 1062. The intersection of the circles would provide the location of standoff target 1002b.

Mobile Machine Location Determination

FIG. 10B also illustrates one embodiment for using a plurality of standoff target to determine the location of mobile machine 520. For example, when the location information for standoff target 1002a is known but the location information from position determination system 430 is unavailable or reduced in quality. In one embodiment, at point A or Point B, sensor 810 will recognize standoff target 1002a and sensor system 800 will access the known location of standoff target 1002a. Sensor system 800 takes bearing 1053 and distance 1051 measurements to standoff target 1002a and then utilizes the distance in conjunction with the reciprocal bearing measurements to determine a location for mobile machine 520. In one embodiment, by performing additional measurements, such as to standoff target 1002b, the location can be further refined. For example, tens, hundreds or even thousands of additional measurements may be performed to determine an average position for standoff target 1002b. Moreover, depending upon the location information for each standoff target and the number of standoff targets being utilized latitude, longitude and elevation can be determined for mobile machine 520.

In another embodiment, if the distance information is known, e.g., distance 1051 from standoff target 1002a and distance 1061 from standoff target 1002b, but the bearings are not known, a geometrical method such as trilateration can be used to determine the location of mobile machine 520. For example, at point A the distance from mobile machine 520 to standoff target 1002a would result in a first circle of radius 1051 while the distance from mobile machine 520 to standoff target 1002b would result in a second circle of radius 1061. The intersection of the circles would narrow the location of mobile machine 520 down to two possible locations. By referencing previous known location information, the correct of the two possible locations for mobile machine 520 can be determined. Moreover, by adding additional standoff targets to the calculations, x, y and z location information may be determined.

Determine Location Information without Distance Information

In the following discussion, photogrammetry is used without distance or ranging information to determine location information. In general, if the location of mobile machine 520 is known, then photogrammetry can be used to determine the location of standoff targets 1002a or 1002b. Similarly, if the location of standoff targets 1002a or 1002b are known then photogrammetry can be used to determine the location of mobile machine 520.

In general, to determine the location of the standoff target, e.g., standoff target 1002a and/or 1002b, a first photo of the target is taken at point A and then a second photo of the target is taken at point B after mobile machine 520 has traveled known distance 1075. One embodiment measures the angle between sensor 810 and standoff target. For example, to determine the location of standoff target 1002a, angle 1053 is measured at point A and angle 1056 is measured at point B. The law of sines can then be applied to determine the coordinates of standoff target 1002a. The location of standoff target 1002b can be similarly determined by measuring angle 1063 measured at point A and 1066 measured at point B. Once determined, the location of the standoff target 1002a and/or 1002b may be stored in target location database 823 for current and future use.

To determine the location of mobile machine 520 at point A, angle 1053 is measured to standoff target 1002a (having a known location); similarly, angle 1063 is measured to standoff target 1002b (also having a known location). A distance between standoff target 1002a and standoff target 1002b is also determined from the known standoff target location information. The law of sines is then applied to determine the coordinates of mobile machine 520. By repeating the measurements as mobile machine moves, the location information for mobile machine 520 can be determined at point A, point B and the like. For example, at point B, angle 1056 is measured to standoff target 1002a (having a known location); similarly, angle 1066 is measured to standoff target 1002b (also having a known location). Again, the law of sines is used to determine the coordinates of mobile machine 520 at point B. It should be appreciated that the distance 1075 may be user defined and may be dependent upon the desired positional accuracy. That is, distance 1075 may be a few centimeters if desired location accuracy is high. Additionally, although only two points are shown in FIG. 10B, the number of measurement points are shown for clarity, the actual number of measurements may differ.

Example NSS Receiver

Figure 11:
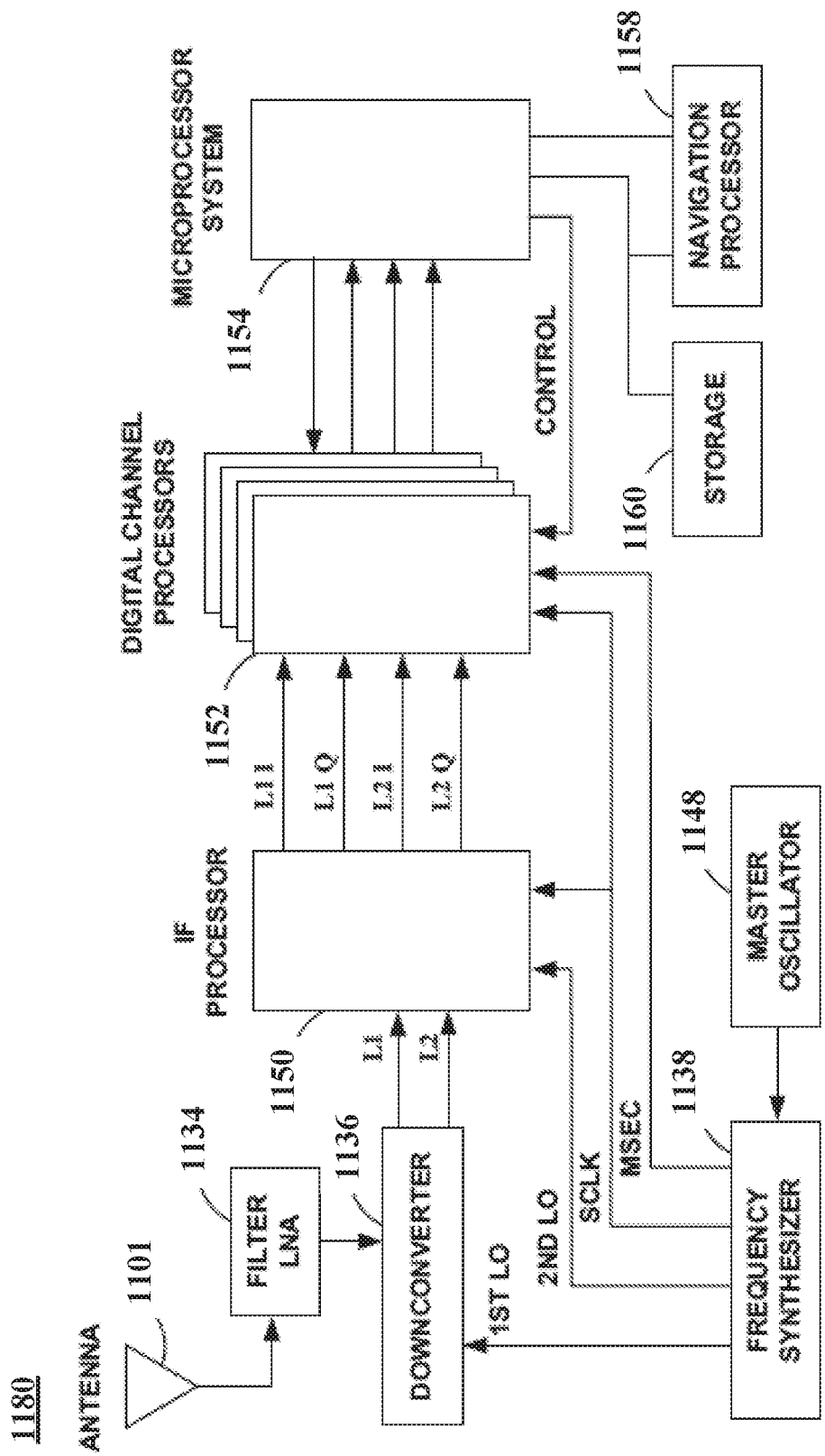
FIG. 11 is a block diagram of an example navigation satellite system (NSS) receiver which may be used in accordance with one embodiment of the present technology.

With reference now to FIG. 11, a block diagram is shown of an embodiment of an example NSS receiver which may be used in accordance with various embodiments described herein. In particular, FIG. 11 illustrates a block diagram of a NSS receiver in the form of a general purpose GPS receiver 1180 capable of demodulation of the L1, L2, L5, etc. signal(s) received from one or more GPS satellites. For the purposes of the following discussion, the demodulation of L1 and/or L2 signals is discussed. However, it should be noted that the discussion of L1 and L2 signals is provide for clarity. The present technology is well suited to using numerous other signals that may be provided by NSS now and in the future. It is noted that demodulation of the L2 signal(s) is typically performed by "high precision" NSS receivers such as those used in the military and some civilian applications. Typically, the "consumer" grade NSS receivers do not access the L2 signal(s). Further, although L1 and L2 signals are described, they should not be construed as a limitation to the signal type; instead, the use of the L1 and L2 signal(s) is provided merely for clarity in the present discussion.

Although an embodiment of an NSS receiver and operation with respect to GPS is described herein, the technology is well suited for use with numerous other NSS signal(s) including, but not limited to, GPS signal(s), GLONASS signal(s), Galileo signal(s), and Compass signal(s).

The technology is also well suited for use with regional navigation satellite system signal(s) including, but not limited to, Omnistar signal(s), StarFire signal(s), Centerpoint signal(s), Beidou signal(s), Doppler orbitography and radio-positioning integrated by satellite (DORIS) signal(s), Indian regional navigational satellite system (IRNSS) signal(s), quasi-zenith satellite system (QZSS) signal(s), and the like.

Moreover, the technology may utilize various satellite based augmentation system (SBAS) signal(s) such as, but not limited to, wide area augmentation system (WAAS) signal(s), European geostationary navigation overlay service (EGNOS) signal(s), multi-functional satellite augmentation system (MSAS) signal(s), GPS aided geo augmented navigation (GAGAN) signal(s), and the like.

In addition, the technology may further utilize ground based augmentation systems (GBAS) signal(s) such as, but not limited to, local area augmentation system (LAAS) signal(s), ground-based regional augmentation system (GRAS) signals, Differential GPS (DGPS) signal(s), continuously operating reference stations (CORS) signal(s), and the like. In addition, the ground based systems may be pseudolites such as Trimble's Terralite system, ultra wide band (UWB) systems and the like that can operate as stand-alone or as augmentations to NSS systems.

Although the example herein utilizes GPS, the present technology may utilize any of the plurality of different navigation system signal(s). Moreover, the present technology may utilize two or more different types of navigation system signal(s) to generate location information. Thus, although a GPS operational example is provided herein it is merely for purposes of clarity.

Embodiments of the present technology may be utilized by NSS receivers which access the L1 signals alone, or in combination with the L2 signal(s). A more detailed discussion of the function of a receiver such as GPS receiver 1180 can be found in U.S. Pat. No. 5,621,426. U.S. Pat. No. 5,621,426, by Gary R. Lennen, entitled "Optimized processing of signals for enhanced cross-correlation in a satellite positioning system receiver," incorporated by reference which includes a GPS receiver very similar to GPS receiver 1180 of FIG. 11.

In FIG. 11, received L1 and L2 signal is generated by at least one GPS satellite. Each GPS satellite generates different signal L1 and L2 signals and they are processed by different digital channel processors 1152 which operate in the same way as one another. FIG. 11 shows GPS signals (L1=1575.42 MHz, L2=1227.60 MHz) entering GPS receiver 1180 through a dual frequency antenna 1101. Antenna 1101 may be a magnetically mountable model commercially available from Trimble® Navigation of Sunnyvale, Calif., 94085. Master oscillator 1148 provides the reference oscillator which drives all other clocks in the system. Frequency synthesizer 1138 takes the output of master oscillator 1148 and generates important clock and local oscillator frequencies used throughout the system. For example, in one embodiment frequency synthesizer 1138 generates several timing signals such as a 1st LO1 (local oscillator) signal 1400 MHz, a 2nd LO2 signal 175 megahertz (MHz), a (sampling clock) SCLK signal 25 MHz, and a MSEC (millisecond) signal used by the system as a measurement of local reference time.

A filter/LNA (Low Noise Amplifier) 1134 performs filtering and low noise amplification of both L1 and L2 signals. The noise figure of GPS receiver 1180 is dictated by the performance of the filter/LNA combination. The downconverter 1136 mixes both L1 and L2 signals in frequency down to approximately 175 MHz and outputs the analogue L1 and L2 signals into an IF (intermediate frequency) processor 1150. IF processor 1150 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 1152 inputs the digitally sampled L1 and L2 inphase and quadrature signals. All digital channel processors 1152 are typically identical by design and typically operate on identical input samples. Each digital channel processor 1152 is designed to digitally track the L1 and L2 signals produced by one satellite by tracking code and carrier signals and to form code and carrier phase measurements in conjunction with the microprocessor system 1154. One digital channel processor 1152 is capable of tracking one satellite in both L1 and L2 channels.

Microprocessor system 1154 is a general purpose computing device which facilitates tracking and measurements processes, providing pseudorange and carrier phase measurements for a navigation processor 1158. In one embodiment, microprocessor system 1154 provides signals to control the operation of one or more digital channel processors 1152. Navigation processor 1158 performs the higher level function of combining measurements in such a way as to produce position, velocity and time information for the differential and surveying functions. Storage 1160 is coupled with navigation processor 1158 and microprocessor system 1154. It is appreciated that storage 1160 may comprise a volatile or non-volatile storage such as a RAM or ROM, or some other non-transitory computer readable storage medium.

One example of a GPS chipset upon which embodiments of the present technology may be implemented is the Maxwell™ chipset which is commercially available from Trimble® Navigation of Sunnyvale, Calif., 94085.

Example Computer System Environment

Figure 12:
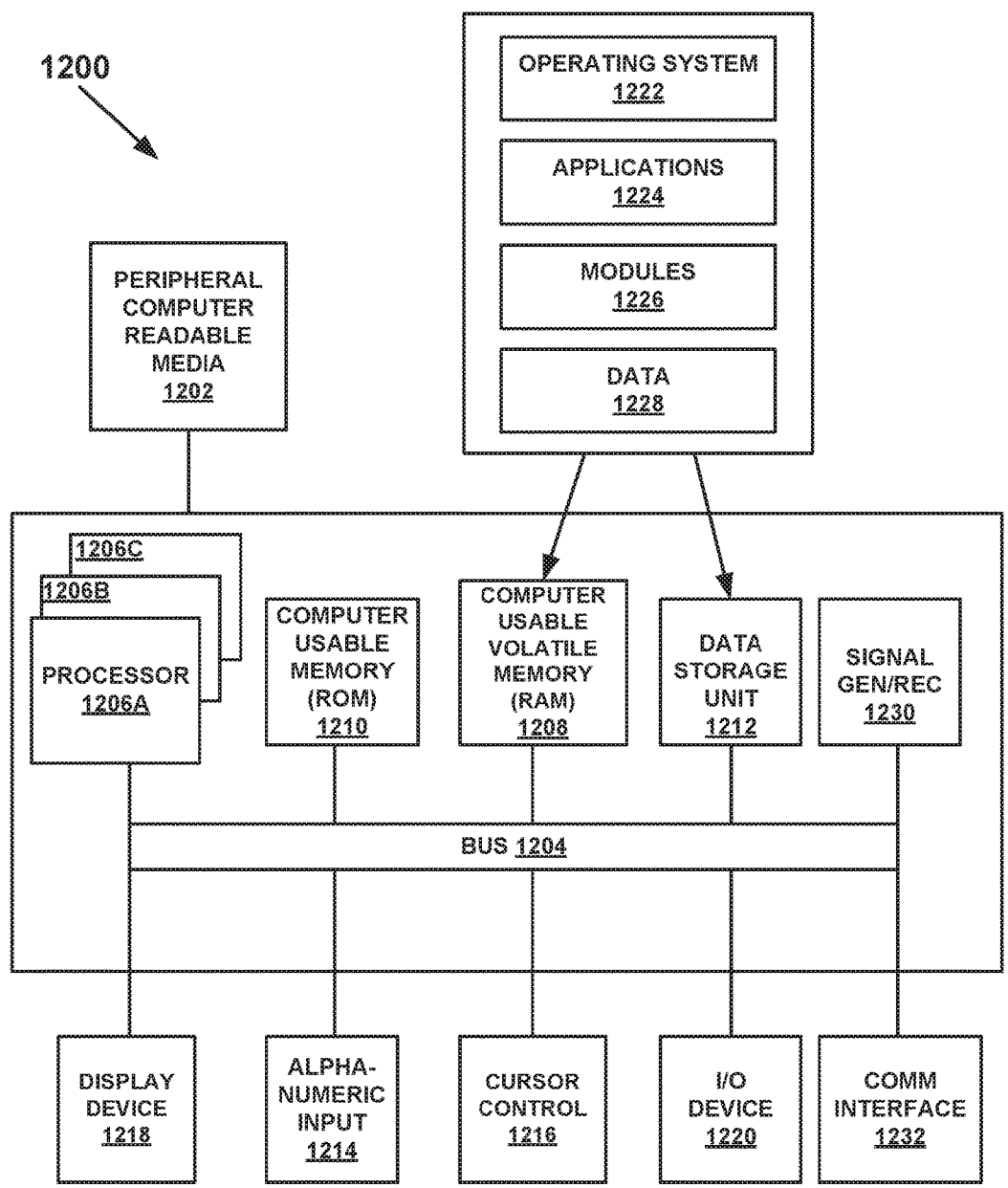
FIG. 12 shows an example computing system which may be included as a component of an eReader, according to various embodiments

With reference now to FIG. 12, portions of the described technology are composed of computer-readable and computer-executable instructions that reside, for example, in non-transitory computer-usable storage media of a computer system. That is, FIG. 12 illustrates one example of a type of computer system that can be used to implement embodiments of the present technology. FIG. 12 represents a system or components that may be used in conjunction with aspects of the present technology. For example, in some embodiments, when one or more of standoff target measurer 820, standoff target location determiner 830, and mobile machine position determiner 840 are not implemented in hardware, they may be implemented by a processor and/or other components of computer system 1200 executing computer readable instructions.

FIG. 12 illustrates an example computer system 1200 used in accordance with embodiments of the present technology. It is appreciated that system 1200 of FIG. 12 is an example only and that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. As shown in FIG. 12, computer system 1200 of FIG. 12 is well adapted to having peripheral computer readable media 1202 such as, for example, a compact disc, a flash drive, and the like coupled thereto.

Computer system 1200 of FIG. 12 includes an address/data/control bus 1204 for communicating information, and a processor 1206A coupled to bus 1204 for processing information and instructions. As depicted in FIG. 12, system 1200 is also well suited to a multi-processor environment in which a plurality of processors 1206A, 1206B, and 1206C are present. Conversely, system 1200 is also well suited to having a single processor such as, for example, processor 1206A. Processors 1206A, 1206B, and 1206C may be any of various types of microprocessors. Computer system 1200 also includes data storage features such as a computer usable volatile memory 1208, e.g., random access memory (RAM), coupled to bus 1204 for storing information and instructions for processors 1206A, 1206B, and 1206C.

System 1200 also includes computer usable non-volatile memory 1210, e.g., read only memory (ROM), coupled to bus 1204 for storing static information and instructions for processors 1206A, 1206B, and 1206C. Also present in system 1200 is a data storage unit 1212 (e.g., a magnetic or optical disk and disk drive) coupled to bus 1204 for storing information and instructions. Computer system 1200 also includes an optional alpha-numeric input device 1214 including alphanumeric and function keys coupled to bus 1204 for communicating information and command selections to processor 1206A or processors 1206A, 1206B, and 1206C. Computer system 1200 also includes an optional cursor control device 1216 coupled to bus 1204 for communicating user input information and command selections to processor 1206A or processors 1206A, 1206B, and 1206C. Optional cursor control device may be a touch sensor, gesture recognition device, and the like. Computer system 1200 of the present embodiment also includes an optional display device 1218 coupled to bus 1204 for displaying information.

Referring still to FIG. 12, optional display device 1218 of FIG. 12 may be a liquid crystal device, cathode ray tube, OLED, plasma display device or other display device suitable for creating graphic images and alpha-numeric characters recognizable to a user. Optional cursor control device 1216 allows the computer user to dynamically signal the movement of a visible symbol (cursor) on a display screen of display device 1218. Many implementations of cursor control device 1216 are known in the art including a trackball, mouse, touch pad, joystick or special keys on alpha-numeric input device 1214 capable of signaling movement of a given direction or manner of displacement. Alternatively, it will be appreciated that a cursor can be directed and/or activated via input from alpha-numeric input device 1214 using special keys and key sequence commands.

System 1200 is also well suited to having a cursor directed by other means such as, for example, voice commands. Computer system 1200 also includes an I/O device 1220 for coupling system 1200 with external entities. For example, in one embodiment, I/O device 1220 is a modem for enabling wired or wireless communications between system 1200 and an external network such as, but not limited to, the Internet or intranet. A more detailed discussion of the present technology is found below.

Referring still to FIG. 12, various other components are depicted for system 1200. Specifically, when present, an operating system 1222, applications 1224, modules 1226, and data 1228 are shown as typically residing in one or some combination of computer usable volatile memory 1208, e.g., random access memory (RAM), and data storage unit 1212. However, it is appreciated that in some embodiments, operating system 1222 may be stored in other locations such as on a network or on a flash drive; and that further, operating system 1222 may be accessed from a remote location via, for example, a coupling to the internet. In one embodiment, the present technology, for example, is stored as an application 1224 or module 1226 in memory locations within RAM 1208 and memory areas within data storage unit 1212. The present technology may be applied to one or more elements of described system 1200.

System 1200 also includes one or more signal generating and receiving device(s) 1230 coupled with bus 1204 for enabling system 1200 to interface with other electronic devices and computer systems. Signal generating and receiving device(s) 1230 of the present embodiment may include wired serial adaptors, modems, and network adaptors, wireless modems, and wireless network adaptors, and other such communication technology. The signal generating and receiving device(s) 1230 may work in conjunction with one or more communication interface(s) 1232 for coupling information to and/or from system 1200. Communication interface 1232 may include a serial port, parallel port, Universal Serial Bus (USB), Ethernet port, Bluetooth, thunderbolt, near field communications port, WiFi, Cellular modem, or other input/output interface. Communication interface 1232 may physically, electrically, optically, or wirelessly (e.g., via radio frequency) couple system 1200 with another device, such as a cellular telephone, radio, or computer system.

The computing system 1200 is only one example of a suitable computing environment and is not intended to suggest any limitation as to the scope of use or functionality of the present technology. Neither should the computing environment 1200 be interpreted as having any dependency or requirement relating to any one or combination of components illustrated in the example computing system 1200.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A system comprising:
 a mobile earth moving machine, comprising:
  a working implement configured to contour soil,
  a position determination system, wherein the position determination system is configured to determine a geographic location of the mobile machine based on received satellite navigation signals; and
 one or more standoff targets, placed in or near an area where the position determining system produces geographic location determination of reduced accuracy as a result of insufficient satellite navigation signal quality,
 wherein the mobile earth moving machine further comprises:
  a sensor configured to automatically sense a standoff target signal from one or more of the standoff targets,
  a processor, configured to, in response to the position determining system receiving satellite navigation signals of insufficient quality, determine location information for the one or more standoff targets, wherein the processor is further configured to determine a distance and a direction between the mobile machine and each of the one or more standoff targets, wherein the processor is further configured to determine a position for the mobile machine, wherein the position for the mobile machine is determined based on:
   a) the location information for each of the one or more standoff targets, and
   b) the distance between the mobile machine and each of the one or more standoff targets in conjunction with the direction between the mobile machine and each of the one or more standoff targets, and
  an earthmoving implement configured to contour soil, wherein the processor is further configured to determine a position of the earthmoving implement according to the position of the mobile machine as determined based on either the satellite navigation signals or the location information and the distance between the mobile machine and each of the one or more standoff targets.

2. The system of claim 1, wherein:
 the one or more standoff targets comprises at least three standoff targets; and
 the processor is further configured to utilize a last reliable position for the mobile machine from the position determination system, the location information for each of the at least three standoff targets, and the distance and direction from the mobile machine to each of the at least three standoff targets to determine position information for the mobile machine.

3. The system of claim 1, wherein the one or more standoff targets are placed in a non-surveyed location and determining the location information of the one or more standoff targets comprises:
 taking at least two photos of each of the one or more standoff targets over a known time interval;
 measuring a distance moved during the known time interval; and the processor performing an angular displacement change to determine the location information of each of the one or more standoff targets.

4. The system of claim 1, wherein each of the one or more standoff targets is selected from the group consisting of: a standoff target mounted on a stationary object and a standoff target mounted on a mobile object.

5. The system of claim 1, wherein the each of the one or more standoff targets has a unique passive identifier selected from the group consisting of: an optical pattern and a height.

6. The system of claim 1, wherein each of the one or more standoff targets has a unique active identifier selected from the group consisting of: an infra-red identifier, a unique light pattern identifier, a personal area network identifier, and a radio frequency identification (RFID) tag.

7. A non-transitory computer readable storage medium comprising instructions which, when executed, cause a computer system to perform a method for auto recognition of one or more standoff targets to determine position information for a mobile earthmoving machine, said method comprising:
receiving an indication of a location of a mobile earthmoving machine from a position determination system, wherein the position determination system is configured to determine a geographic location of the mobile machine based on received satellite navigation signals;
automatically scanning for the one or more standoff targets;
determining location information for each of the one or more standoff targets;
generating a distance and a direction between the mobile machine and each of the one or more standoff targets;
determining a position for the mobile machine, wherein the position for the mobile machine is determined based on:
a) the location information for the one or more standoff targets, and
b) the distance between the mobile machine and each of the one or more standoff targets in conjunction with the direction between the mobile machine and each of the one or more standoff targets; and
determining a position of an earthmoving implement on the earthmoving machine according to the position of the mobile machine as determined based on either of the satellite navigation signals and the location information and the distance between the mobile machine and each of the one or more standoff targets, wherein the earthmoving implement is configured to contour soil, wherein the position of the earthmoving implement is determined according to the position of the mobile machine as determined based on the location information and the distance between the mobile machine and each of the one or more standoff targets in response to the position determining system receiving satellite navigation signals of insufficient quality.

8. The non-transitory computer readable storage medium of claim 7, wherein said method further comprises:
identifying at least three different standoff targets;
determining a location of each of the at least three different standoff targets; and
using a last reliable position for the mobile machine from the position determination system, the location for each of the at least three standoff targets, and the distance and direction from the mobile machine to each of the at least three standoff targets to determine position information for the mobile machine.

9. The non-transitory computer readable storage medium of claim 7, wherein each of the one or more standoff targets is placed in a non-surveyed location and wherein the determining the location information for each of the one or more standoff targets comprises:
taking at least two photos of the each of the one or more standoff targets at different locations;
measuring a distance moved between the different locations; and
utilizing an angular displacement change to determine the location information of the each of the one or more standoff targets.

10. The non-transitory computer readable storage medium of claim 7, wherein the location information of each of the one or more standoff targets is stored in a database.

11. The non-transitory computer readable storage medium of claim 7, wherein each of the one or more stand standoff targets has a unique passive identifier selected from the group consisting of: an optical pattern and a height.

12. The non-transitory computer readable storage medium of claim 7, wherein each of the one or more standoff targets has a unique active identifier selected from the group consisting of: an infra-red identifier, a unique light pattern identifier, a personal area network identifier, and a radio frequency identification (RFID) tag.

13. The non-transitory computer readable storage medium of claim 7, wherein the method further comprises:
using a last reliable position for the mobile machine from the position determination system, the location information for each of the one or more standoff targets, and the distance and direction from the mobile machine to each of the one or more standoff targets to determine position information for the mobile machine.

14. A system comprising:
a mobile earth moving machine, comprising:
a working implement configured to contour soil, and
a position determination system, wherein the position determination system is configured to determine a geographic location of the mobile machine based on received satellite navigation signals; and
at least three standoff targets, placed in or near an area where the position determining system produces geographic location determination of reduced accuracy as a result of insufficient satellite navigation signal quality,
wherein the mobile earth moving machine further comprises:
a sensor configured to automatically sense a standoff target signal from each of the standoff targets,
a processor, configured to, in response to the position determining system receiving satellite navigation signals of insufficient quality, determine location information for the standoff targets, wherein the processor is further configured to determine a distance and a direction between the mobile machine and each of the standoff targets, wherein the processor is further configured to determine a position for the mobile machine, wherein the position for the mobile machine is determined based on:
a) the location information for each of the standoff targets, and
b) the distance between the mobile machine and each of the standoff targets in conjunction with the direction between the mobile machine and each of the standoff targets, and an earthmoving implement configured to contour soil, wherein the processor is further configured to determine a position of the earthmoving implement according to the position of the mobile machine as determined based on either the satellite navigation signals or the location information and the distance between the mobile machine and each of the standoff targets.

15. The system of claim 14, wherein a particular standoff target is placed in a surveyed location and the location of the particular standoff target is associated with a standoff target identifier.

16. The system of claim 14, wherein a particular standoff target is placed in a non-surveyed location and determining the location information of the particular standoff target comprises:
   taking at least two photos of the particular standoff target at different locations;
   measuring a distance between the different locations; and
   the processor performing an angular displacement change to determine the location information of the particular standoff target.

17. The system of claim 14, wherein a particular standoff target has a unique passive identifier selected from the group consisting of: an optical pattern and a height.

18. The system of particular claim 14, wherein each of the one or more standoff targets has a unique active identifier selected from the group consisting of: an infra-red identifier, a unique light pattern identifier, a personal area network identifier, and a radio frequency identification (RFID) tag.

* * * * *